United States Patent
Chen et al.

(10) Patent No.: US 11,849,213 B2
(45) Date of Patent: Dec. 19, 2023

(54) PARALLEL PREVIEW STREAM AND CALLBACK STREAM PROCESSING METHOD AND DEVICE

(71) Applicant: HUAWEI TECHNOLOGIES CO., LTD., Guangdong (CN)

(72) Inventors: Tankun Chen, Shenzhen (CN); Huayang Wu, Hangzhou (CN); Risheng Shen, Wuhan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/693,032

(22) Filed: Mar. 11, 2022

(65) Prior Publication Data
US 2022/0201201 A1 Jun. 23, 2022

Related U.S. Application Data

(63) Continuation of application No. PCT/CN2020/114342, filed on Sep. 10, 2020.

(30) Foreign Application Priority Data

Sep. 12, 2019 (CN) .......................... 201910867438.2

(51) Int. Cl.
  *H04N 23/60* (2023.01)
  *H04N 5/222* (2006.01)
  *H04N 23/63* (2023.01)
(52) U.S. Cl.
  CPC ........... *H04N 23/64* (2023.01); *H04N 5/2222* (2013.01); *H04N 23/632* (2023.01); *H04N 23/633* (2023.01)
(58) Field of Classification Search
  CPC .... H04N 23/64; H04N 5/2222; H04N 23/632; H04N 23/633; H04N 23/63;
  (Continued)

(56) References Cited

U.S. PATENT DOCUMENTS

2011/0161875 A1* 6/2011 Kankainen ............ G06F 3/0481
  715/810
2012/0033032 A1* 2/2012 Kankainen ............. H04N 23/62
  348/E7.001
(Continued)

FOREIGN PATENT DOCUMENTS

CN 103345385 A 10/2013
CN 103716691 A 4/2014
(Continued)

OTHER PUBLICATIONS

Zeng Min et al, Design and implementation of Android camera application based on OpenCV, Information Technology, 2015, Issue 08, 5 pages.

(Continued)

*Primary Examiner* — Usman A Khan
(74) *Attorney, Agent, or Firm* — WOMBLE BOND DICKINSON (US) LLP

(57) ABSTRACT

Embodiments of this application provide a callback stream processing method and a device, and relate to the field of electronic technologies. In a callback stream scenario, an electronic device may set a preview stream and a callback stream in parallel. After an application sets a callback function, the electronic device may directly return, by using the callback function, callback stream data to the application for processing. This can shorten a time consumed for creating a preview stream and a callback stream, shorten a time consumed for obtaining callback stream data, and shorten a user waiting time.

20 Claims, 32 Drawing Sheets

(58) Field of Classification Search
CPC ...... H04N 23/617; H04N 23/67; H04N 23/62; H04M 2250/52; H04M 1/72403; H04M 1/72448; H04L 51/046
USPC .................................................. 348/333.02
See application file for complete search history.

(56) References Cited

U.S. PATENT DOCUMENTS

| | | | | |
|---|---|---|---|---|
| 2012/0310717 | A1* | 12/2012 | Kankainen | G06Q 30/02 705/14.4 |
| 2013/0050258 | A1* | 2/2013 | Liu | G06F 3/013 345/633 |
| 2013/0346168 | A1* | 12/2013 | Zhou | G06F 1/163 701/428 |
| 2014/0066034 | A1* | 3/2014 | Bang | H04M 1/72403 455/415 |
| 2014/0176663 | A1* | 6/2014 | Cutler | G06T 5/002 348/14.07 |
| 2014/0278053 | A1* | 9/2014 | Wu | G01C 21/3438 701/408 |
| 2016/0019068 | A1 | 1/2016 | Grant et al. | |
| 2016/0098101 | A1* | 4/2016 | Park | G09G 5/14 345/634 |
| 2017/0039695 | A1* | 2/2017 | Castro | G06T 11/60 |
| 2018/0046353 | A1 | 2/2018 | Lee et al. | |

FOREIGN PATENT DOCUMENTS

| | | |
|---|---|---|
| CN | 103903039 A | 7/2014 |
| CN | 103995787 A | 8/2014 |
| CN | 104184947 A | 12/2014 |
| CN | 105959630 A | 9/2016 |
| CN | 106603910 A | 4/2017 |
| CN | 107360400 A | 11/2017 |
| CN | 107800943 A | 3/2018 |
| CN | 108197029 A | 6/2018 |
| CN | 108737881 A | 11/2018 |
| CN | 108845861 A | 11/2018 |
| CN | 109669783 A | 4/2019 |
| JP | 2004266341 A | 9/2004 |
| JP | 2016502175 A | 1/2016 |
| WO | 2019060430 A1 | 3/2019 |

OTHER PUBLICATIONS

Anonymous: "Controlling the Camera} Android Developers", Sep. 1, 2012 XSep. 1, 2012) XP055314198, httpaldeveloper.android.comltraininglcameralcameradirect.htmlRetrieved fìrom the Internet:URL:https:llweb.archive.orglwebI20120901134413lhttp://developer.android.comltraininglcameralcameradirect.html[retrieved on Oct. 10-26, 2016].

Hiroshi Kawajiri, et al., Mobile Cloud with Smart Terminals, New Business Interface using Smart Terminals, INTEC Technical Journal, vol. 12, INTEC Inc., Jan. 2012, total:7pages.

* cited by examiner

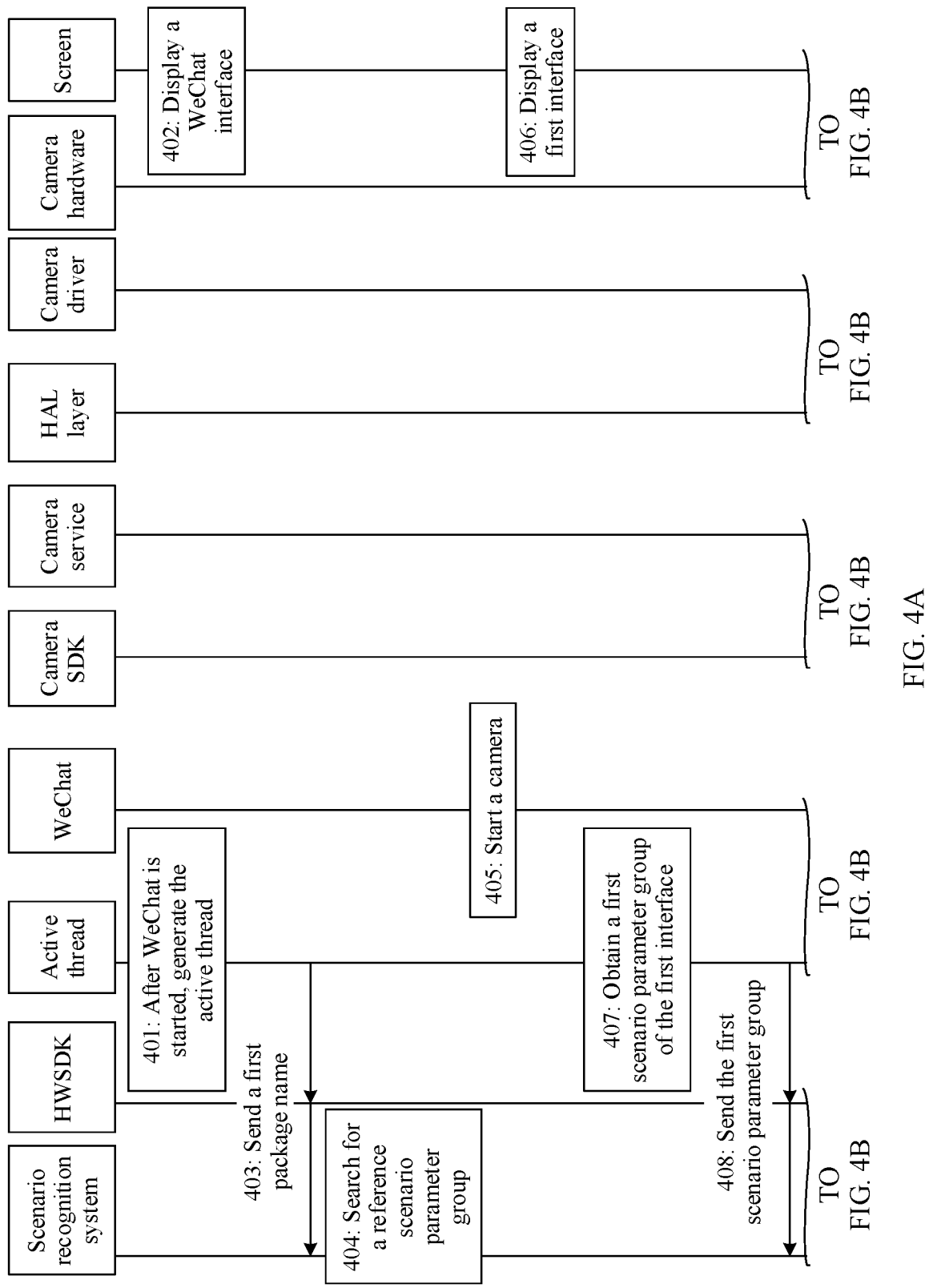

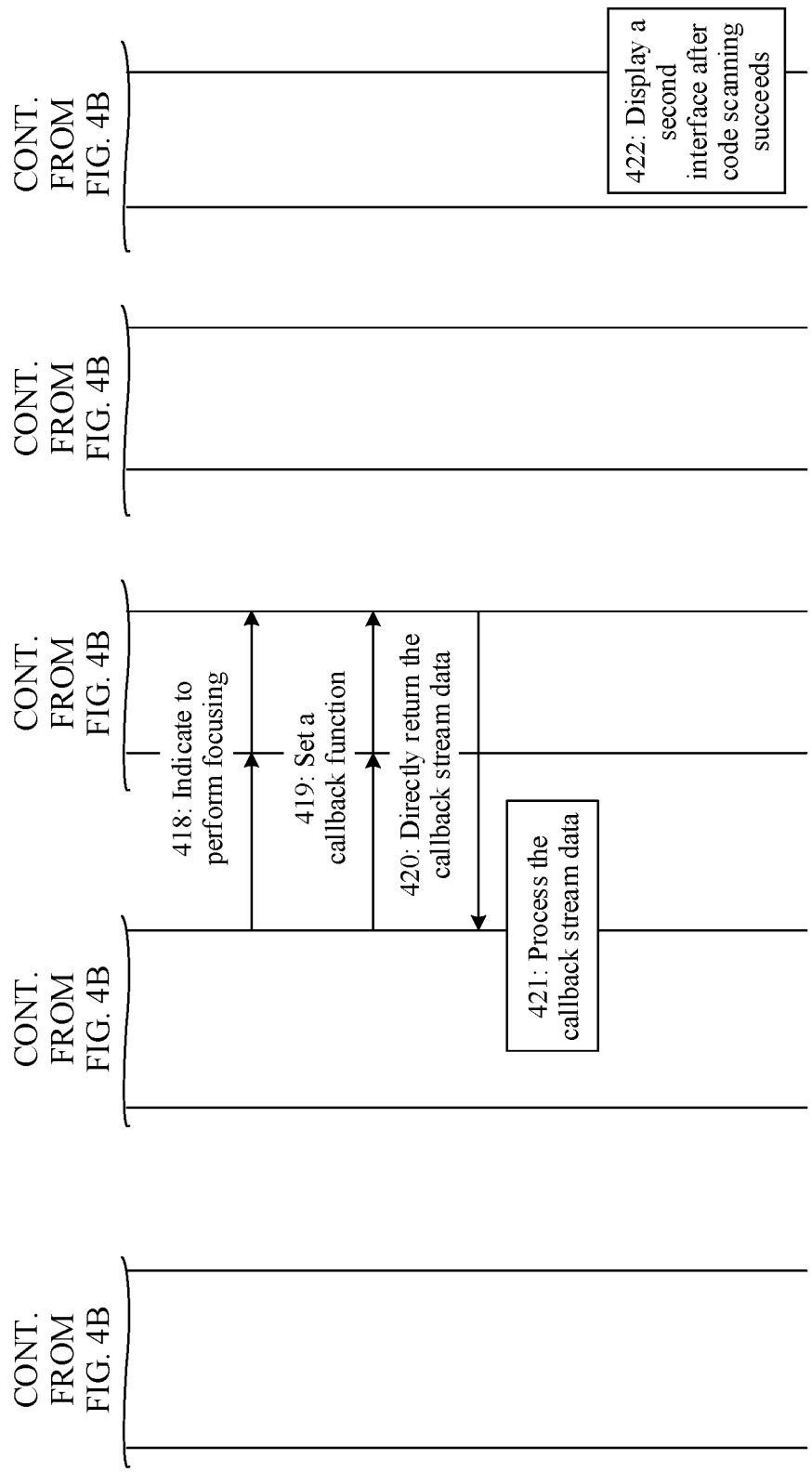

PARALLEL PREVIEW STREAM AND CALLBACK STREAM PROCESSING METHOD AND DEVICE

CROSS-REFERENCE TO RELATED APPLICATIONS

This application is a continuation of International Application No. PCT/CN2020/114342, filed on Sep. 10, 2020, which claims priority to Chinese Patent Application No. 201910867438.2, filed on Sep. 12, 2019. The disclosures of the aforementioned applications are hereby incorporated by reference in their entireties.

TECHNICAL FIELD

Embodiments of this application relate to the field of electronic technologies, and in particular, to a callback stream processing method and a device.

BACKGROUND

Currently, a camera function is added to an increasing quantity of applications (application, app) on an electronic device. For example, an app may use a camera to perform processing such as photographing, code scanning, video chatting, or augmented reality (AR). A user uses the camera by using the app more frequently.

Scenarios in which an app uses a camera function generally include a preview stream (previewStream) of a camera, and some scenarios also include a callback stream (callbackStream). For example, a scenario such as code scanning, video chatting, or AR includes a callback stream, which may be referred to as a callback stream scenario.

In the conventional technology, for the callback stream scenario, refer to FIG. 1A. An app may invoke an openCamera( ) interface to start a camera, and then the app may invoke a startPreview( ) interface to start previewing. After the previewing is started, a hardware abstraction layer (HAL) in an electronic device may create a preview stream. Then, the app may perform initialization processing such as autofocusing. Subsequently, the app may set a callback function. After the callback function is set, the HAL layer may first stop the previous preview stream, create a new preview stream, and create a callback stream after the new preview stream is successfully created. Then, after the callback stream is successfully created, the app obtains callback stream data by using the callback function, and performs processing based on the callback stream data.

In the solution shown in FIG. 1A, when a user invokes the camera by using the app, the app needs a relatively long time to obtain the callback stream data, and then can perform processing based on the callback stream data. Consequently, app processing is relatively time-consuming, and user experience is relatively poor.

SUMMARY

Embodiments of this application provide a callback stream processing method and a device. In a callback stream scenario, an electronic device may set a preview stream and a callback stream in parallel, to start the callback stream in advance and obtain callback stream data. After an application sets a callback function, the electronic device may directly return, by using the callback function, the callback stream data to the application for processing. This can shorten a time consumed by the electronic device for creating a preview stream and a callback stream, shorten a time consumed by the application for obtaining callback stream data, shorten a processing time of the application and a user waiting time, and improve user experience.

To achieve the foregoing objectives, the following technical solutions are used in the embodiments of this application.

According to one aspect, an embodiment of this application provides a callback stream processing method. The method is applied to an electronic device, and includes: The electronic device detects a first operation that a user uses a first function of a first application. In response to the first operation, the electronic device starts a camera application, and displays a first interface corresponding to the first function. Then, the electronic device creates a preview stream and a first callback stream in parallel. Subsequently, the electronic device obtains first data. The first data is callback stream data corresponding to the first callback stream. The electronic device sets a callback function, and provides, by using the callback function, the first data for the first application for processing, to implement the first function.

In this way, compared with the conventional technology in which the electronic device serially creates a preview stream and a callback stream, a method in which the electronic device may create a preview stream and a callback stream in parallel can shorten a time consumed by the electronic device for creating a preview stream and a callback stream, shorten a time consumed by the first application for obtaining callback stream data, shorten a time consumed by the first application for processing the callback stream data to implement the first function, shorten a waiting time consumed by the user for using the first function, and improve user experience.

It may be understood that the first application is merely a name and is used to distinguish from another application. The first application may be replaced with a target application, an application, a particular application, a preset application, WeChat, Alipay, QQ, Facetime, Skype, Taobao, Meituan, Jingdong, or the like.

It may be understood that the first function is merely used to distinguish from another function. The first function may be replaced with a particular function, a preset function, a target function, a function, a code scanning function, a video chatting function, an augmented reality AR function, a smart object recognition function, a question scanning function, a bank card scanning function, a certificate scanning function, or the like.

It may be understood that the first operation is merely a name and is used to distinguish from another operation. The first operation may be replaced with an input operation, a tap operation, a gesture input operation, a voice input operation, or the like.

In one embodiment, the electronic device includes a parameter matching library, the parameter matching library includes at least one scenario parameter group, and the scenario parameter group includes a package name, an activity name, and a page name of an application. Before the electronic device creates the preview stream and the first callback stream in parallel, the method further includes: The electronic device obtains a first scenario parameter group corresponding to the first interface. The electronic device determines that the first scenario parameter group matches a scenario parameter group in the parameter matching library.

In other words, when determining that the first scenario parameter group corresponding to the first interface matches a scenario parameter group in the parameter matching library, the electronic device may determine that a current scenario is a callback stream scenario, so that the electronic device can create the preview stream and the first callback stream in parallel.

In one embodiment, after the electronic device displays the first interface corresponding to the first function, the method further includes: The electronic device obtains a first package name of the first application corresponding to the first interface. The electronic device searches the parameter matching library for a reference scenario parameter group including the first package name. That the electronic device determines that the first scenario parameter group matches a scenario parameter group in the parameter matching library includes: The electronic device determines that the first scenario parameter group matches the reference scenario parameter group.

In this solution, the electronic device may first find, from a large quantity of reference scenario parameter groups in the parameter matching library, a relatively small quantity of reference scenario parameter groups including the first package name, so that the electronic device quickly determines, based on the relatively small quantity of reference scenario parameter groups, whether the current scenario is the callback stream scenario.

In one embodiment, the at least one scenario parameter group in the parameter matching library is integrated into a package file of the first application; or the at least one scenario parameter group in the parameter matching library is pushed by a server; or the at least one scenario parameter group in the parameter matching library is obtained by the electronic device through learning.

In other words, the electronic device may obtain the reference scenario parameter group in the parameter matching library in a plurality of manners.

In one embodiment, the method further includes: If the first scenario parameter group does not match a scenario parameter group in the parameter matching library, the electronic device creates the preview stream. If the electronic device sets the callback function, the electronic device creates a second callback stream. Then, the electronic device obtains second data. The second data is callback stream data corresponding to the second callback stream. The electronic device provides, by using the callback function, the second data for the first application for processing. The electronic device stores the first scenario parameter group in the parameter matching library.

In this solution, after determining to create a callback stream, the electronic device determines that the current scenario is the callback stream scenario, so that the electronic device can add the first scenario parameter group to the parameter matching library. Therefore, the electronic device subsequently determines, based on the first scenario parameter group in the parameter matching library, whether the current scenario is the callback stream scenario.

In one embodiment, before the electronic device obtains the first data, the method further includes: The electronic device performs focusing by using the camera application.

In this way, the electronic device may return, to the first application, callback stream data corresponding to a clear image obtained after the electronic device completes the focusing, so that the first application performs processing based on the callback stream data, to implement the first function.

In one embodiment, the first function is a code scanning function, a video chatting function, an augmented reality AR function, a smart object recognition function, a question scanning function, a bank card scanning function, or a certificate scanning function.

In other words, the electronic device may implement a plurality of camera-related functions by using the foregoing callback stream processing method.

In one embodiment, an operating system of the electronic device includes a camera service. After the electronic device determines that the first scenario parameter group matches a scenario parameter group in the parameter matching library, the method further includes: The camera service sets identification information. That the electronic device creates a preview stream and a first callback stream in parallel includes: The first application indicates to start previewing. The camera service creates the preview stream and the first callback stream in parallel based on the identification information. The camera service deletes the identification information after creating the first callback stream.

In other words, the electronic device may create the preview stream and the callback stream in parallel by using the operating system and the identification information.

In one embodiment, that the electronic device obtains first data includes: The camera service obtains the first data. That the electronic device sets a callback function includes: The first application sets the callback function. That the electronic device provides, by using the callback function, the first data for the first application for processing includes: The camera service provides, by using the callback function, the first data for the first application for processing.

In other words, the electronic device may create a callback stream and obtain callback stream data by using a module such as the internal camera service or the first application.

According to another aspect, an embodiment of this application provides a two-dimensional code scanning method. The method is applied to an electronic device, and includes: After detecting a first operation performed by a user on a code scanning function, the electronic device starts a camera application in response to the first operation. The electronic device displays a first interface corresponding to the code scanning function. A camera lens of the camera of the electronic device is aligned with a two-dimensional code. After creating a preview stream and a callback stream in parallel, the electronic device obtains first data based on the preview stream. The electronic device displays a first image of the two-dimensional code based on the first data. After completing focusing, the electronic device obtains second data based on the callback stream. The second data and the first data have different data formats. Then, the electronic device completes code scanning recognition based on the second data, and displays a second interface after code scanning succeeds.

In this way, compared with the conventional technology in which the electronic device serially creates a preview stream and a callback stream, a method in which the electronic device may create a preview stream and a callback stream in parallel can shorten a time consumed by the electronic device for creating a preview stream and a callback stream, shorten a time consumed by the first application for obtaining callback stream data, shorten a time consumed by the first application for processing the callback stream data to implement the two-dimensional code scanning function, shorten a waiting time consumed by the user for using the code scanning function, and improve user experience.

In one embodiment, before the electronic device completes the focusing, the method further includes: The electronic device obtains third data based on the callback stream; and the electronic device discards the third data.

The third data is callback stream data obtained by the electronic device based on the callback stream before the electronic device completes the focusing. Because the callback stream data obtained before the focusing is completed is not reported to the app, the electronic device may discard the callback stream data.

In one embodiment, after the electronic device completes the focusing, the method further includes: The electronic device obtains fourth data based on the preview stream; and the electronic device displays a second image of the two-dimensional code based on the fourth data. The first image and the second image have different pixel values of pixels.

The fourth data is preview stream data obtained by the electronic device based on the preview stream before the electronic device completes the focusing. The first image of the two-dimensional code displayed based on the callback stream data obtained by the electronic device before the electronic device completes the focusing is usually blurred, and the second image of the two-dimensional code displayed based on the callback stream data obtained by the electronic device after the electronic device completes the focusing is usually clear. Therefore, the first image and the second image have different pixel values of pixels.

According to another aspect, an embodiment of this application provides an electronic device. The electronic device includes: a screen, configured to display an interface; one or more processors; and a memory. The memory stores code. When the code is executed by the electronic device, the electronic device is enabled to perform the following operations: detecting a first operation that a user uses a first function of a first application; starting a camera application in response to the first operation; displaying a first interface corresponding to the first function; creating a preview stream and a first callback stream in parallel; obtaining first data, where the first data is callback stream data corresponding to the first callback stream; setting a callback function; and providing, by using the callback function, the first data for the first application for processing, to implement the first function.

In one embodiment, the electronic device includes a parameter matching library, the parameter matching library includes at least one scenario parameter group, and the scenario parameter group includes a package name, an activity name, and a page name of an application. When the code is executed by the electronic device, the electronic device is further enabled to perform the following operations: before the creating a preview stream and a first callback stream in parallel, obtaining a first scenario parameter group corresponding to the first interface; and determining that the first scenario parameter group matches a scenario parameter group in the parameter matching library.

In one embodiment, when the code is executed by the electronic device, the electronic device is further enabled to perform the following operations: after the displaying a first interface corresponding to the first function, obtaining a first package name of the first application corresponding to the first interface; and searching the parameter matching library for a reference scenario parameter group including the first package name. The determining that the first scenario parameter group matches a scenario parameter group in the parameter matching library includes: determining that the first scenario parameter group matches the reference scenario parameter group.

In one embodiment, the at least one scenario parameter group in the parameter matching library is integrated into a package file of the first application; or the at least one scenario parameter group in the parameter matching library is pushed by a server; or the at least one scenario parameter group in the parameter matching library is obtained by the electronic device through learning.

In one embodiment, when the code is executed by the electronic device, the electronic device is further enabled to perform the following operations: if the first scenario parameter group does not match a scenario parameter group in the parameter matching library, creating the preview stream; if the callback function is set, creating a second callback stream; obtaining second data, where the second data is callback stream data corresponding to the second callback stream; providing, by using the callback function, the second data for the first application for processing; and storing the first scenario parameter group in the parameter matching library.

In one embodiment, when the code is executed by the electronic device, the electronic device is further enabled to perform the following operation: before the obtaining first data, performing focusing by using the camera application.

In one embodiment, an operating system of the electronic device includes a camera service. When the code is executed by the electronic device, the electronic device is further enabled to perform the following operation: After the determining that the first scenario parameter group matches a scenario parameter group in the parameter matching library, the camera service sets identification information. The creating a preview stream and a first callback stream in parallel includes: The first application indicates to start previewing; the camera service creates the preview stream and the first callback stream in parallel based on the identification information; and the camera service deletes the identification information after creating the first callback stream.

In one embodiment, the obtaining first data includes: The camera service obtains the first data. The setting a callback function includes: The first application sets the callback function. The providing, by using the callback function, the first data for the first application for processing includes: The camera service provides, by using the callback function, the first data for the first application for processing.

In one embodiment, the first function is a code scanning function, a video chatting function, an augmented reality AR function, a smart object recognition function, a question scanning function, a bank card scanning function, or a certificate scanning function.

According to another aspect, an embodiment of this application provides an electronic device. The electronic device includes: a screen, configured to display an interface; one or more processors; and a memory. The memory stores code. When the code is executed by the electronic device, the electronic device is enabled to perform the following operations: detecting a first operation performed by a user on a code scanning function; starting a camera application in response to the first operation; displaying a first interface corresponding to the code scanning function, where a camera lens of the camera of the electronic device is aligned with a two-dimensional code; creating a preview stream and a callback stream in parallel; obtaining first data based on the preview stream; displaying a first image of the two-dimensional code based on the first data; after the electronic device completes focusing, obtaining second data based on the callback stream, where the second data and the first data have different data formats; and completing code scanning recognition based on the second data, and displaying a second interface after code scanning succeeds.

In one embodiment, when the code is executed by the electronic device, the electronic device is further enabled to perform the following operations: before the electronic device completes the focusing, obtaining third data based on the callback stream; and discarding the third data.

In one embodiment, when the code is executed by the electronic device, the electronic device is further enabled to perform the following operations: after the electronic device completes the focusing, obtaining fourth data based on the preview stream; and displaying a second image of the two-dimensional code based on the fourth data. The first image and the second image have different pixel values of pixels.

According to another aspect, an embodiment of this application provides a callback stream processing apparatus. The apparatus is included in an electronic device. The apparatus has functions of implementing behavior of the electronic device in any method according to the foregoing aspects and the possible embodiments. The functions may be implemented by hardware, or may be implemented by hardware executing corresponding software. The hardware or the software includes at least one module or unit corresponding to the foregoing functions, for example, an application module/unit, a framework module/unit, a camera module/unit, and a scenario recognition module/unit.

According to another aspect, an embodiment of this application provides an electronic device. The electronic device includes one or more processors and a memory. The memory stores code. When the code is executed by the electronic device, the electronic device is enabled to perform the callback stream processing method or the two-dimensional code scanning method according to any one of the foregoing aspects and the possible embodiments.

According to another aspect, an embodiment of this application provides a computer storage medium. The computer storage medium includes computer instructions. When the computer instructions are run on an electronic device, the electronic device is enabled to perform the callback stream processing method or the two-dimensional code scanning method according to any one of the foregoing aspects and the possible embodiments.

According to still another aspect, an embodiment of this application provides a computer program product. When the computer program product runs on a computer, the computer is enabled to perform the callback stream processing method or the two-dimensional code scanning method according to any one of the foregoing aspects and the possible embodiments.

According to another aspect, an embodiment of this application provides a chip system. The chip system is applied to an electronic device. The chip system includes one or more interface circuits and one or more processors. The interface circuit and the processor are connected to each other through a line. The interface circuit is configured to: receive a signal from a memory in the electronic device; and send the signal to the processor. The signal includes computer instructions stored in the memory. When the processor executes the computer instructions, the electronic device is enabled to perform the callback stream processing method or the two-dimensional code scanning method according to any one of the foregoing aspects and the possible embodiments.

For beneficial effects corresponding to the foregoing other aspects, refer to the descriptions of the beneficial effects in the method aspects. Details are not described herein again.

BRIEF DESCRIPTION OF DRAWINGS

FIG. 4A to FIG. 4C are a flowchart of scanning according to an embodiment of this application;

FIG. 11A-1 to FIG. 11A-5 are schematic diagrams of interfaces in a scanning process according to the conventional technology;

FIG. 11B-1 to FIG. 11B-4 are schematic diagrams of interfaces in a scanning process according to an embodiment of this application;

DESCRIPTION OF EMBODIMENTS

Figure 1A:
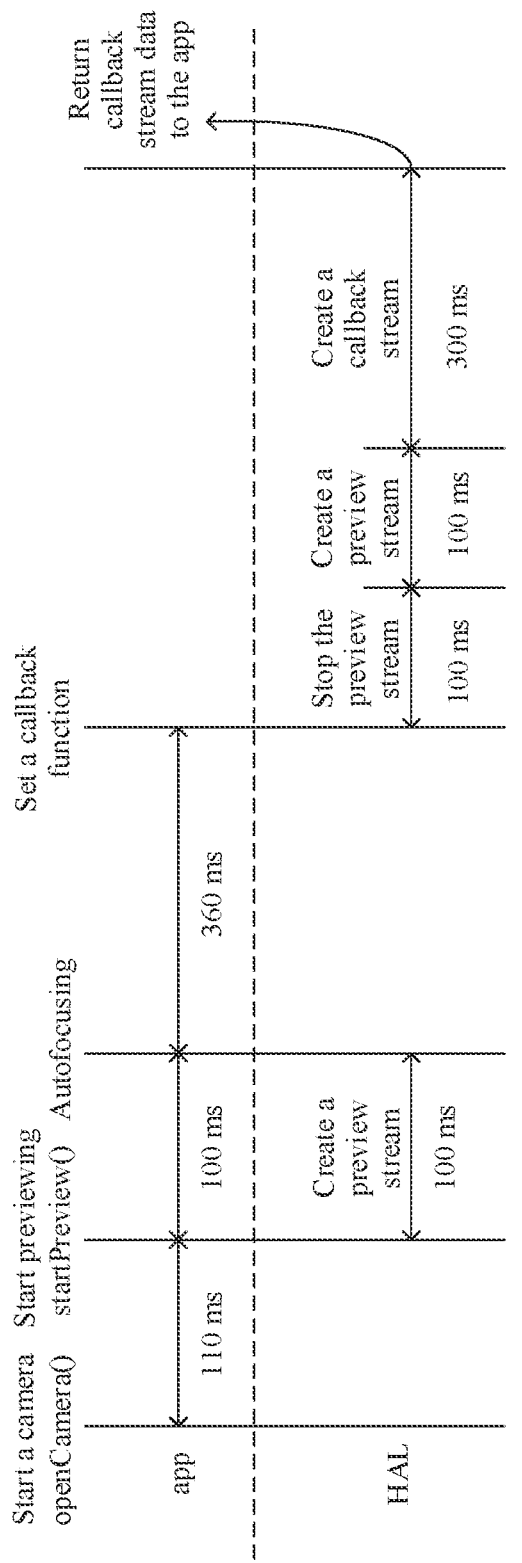
FIG. 1A to FIG. 1C are schematic diagrams of creating a preview stream and a callback stream according to the conventional technology.

The following describes technical solutions in the embodiments of this application with reference to the accompanying drawings in the embodiments of this application. In the descriptions of the embodiments of this application, unless otherwise specified, "l" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in the embodiments of this application, "a plurality of" means two or more.

In a callback stream scenario, different apps create a preview stream and then create a callback stream based on service logic of the apps at different moments. For example, in some conventional technologies, as shown in FIG. 1B, after an app sets a callback function, a HAL layer may update a previous preview stream, and then start to create a callback stream. Then, the app obtains callback stream data by using the callback function, and performs processing based on the callback stream data. In some other conventional technologies, as shown in FIG. 1C, before setting the callback function, the app may directly stop the preview stream or update the preview stream without performing processing such as focusing or initialization, and then start to create the callback stream.

The preview stream is a data stream, and preview stream data includes data information of an image collected by a camera. The preview stream is used to return a preview image collected by the camera to the app, so that the app displays the preview image on a screen.

The callback stream is also a data stream, and callback stream data includes data information of an image collected by the camera. The callback stream data is used to return the data information of the image collected by the camera to the app, so that the app performs processing based on the image data collected by the camera, to implement a function. For example, based on the callback stream data, an electronic device may perform recognition processing during code scanning, or video coding/decoding and uploading processing during video chatting, to implement a code scanning or video chatting function.

For example, in a code scanning scenario, the preview stream data and the callback stream data may include data information of a two-dimensional code image collected by the camera. In addition, after the preview stream is created, the preview stream data is continuously obtained and updated. After the callback stream is created, the callback stream data is continuously obtained and updated.

It should be noted that, because functions of the preview stream and the callback stream are different, and processing manners used after the preview stream and the callback stream are returned to the app are different, data formats of the data information, included in the preview stream and the callback stream, of the two-dimensional code image collected by the camera may also be different. For example, the data format of the preview stream may be format 33 HAL_PIXEL_FORMAT_BLOB or format 34 HAL_PIXEL_FORMAT_IMPLEMENTATION_DEFINED, and the data format of the callback stream may be format 35 HAL_PIXEL_FORMAT_YCbCr_420_888.

It should be further noted that, when the preview stream and the callback stream are created, an upper-layer app of the electronic device needs to invoke a lower-layer interface, and the lower-layer interface further needs to notify underlying hardware to perform corresponding settings, so as to complete creation of the preview stream and the callback stream to obtain the preview stream data and callback stream data. Therefore, a process of creating the preview stream and the callback stream takes some time.

Figure 1B:
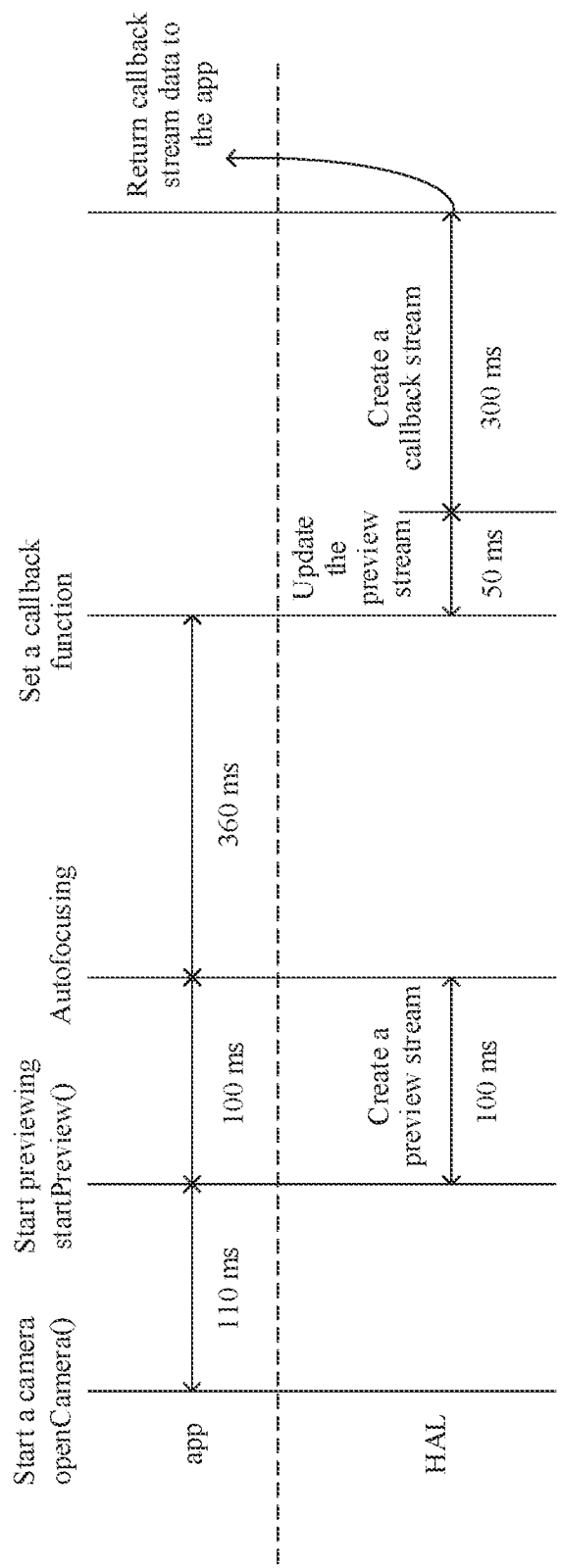
Figure 1C:
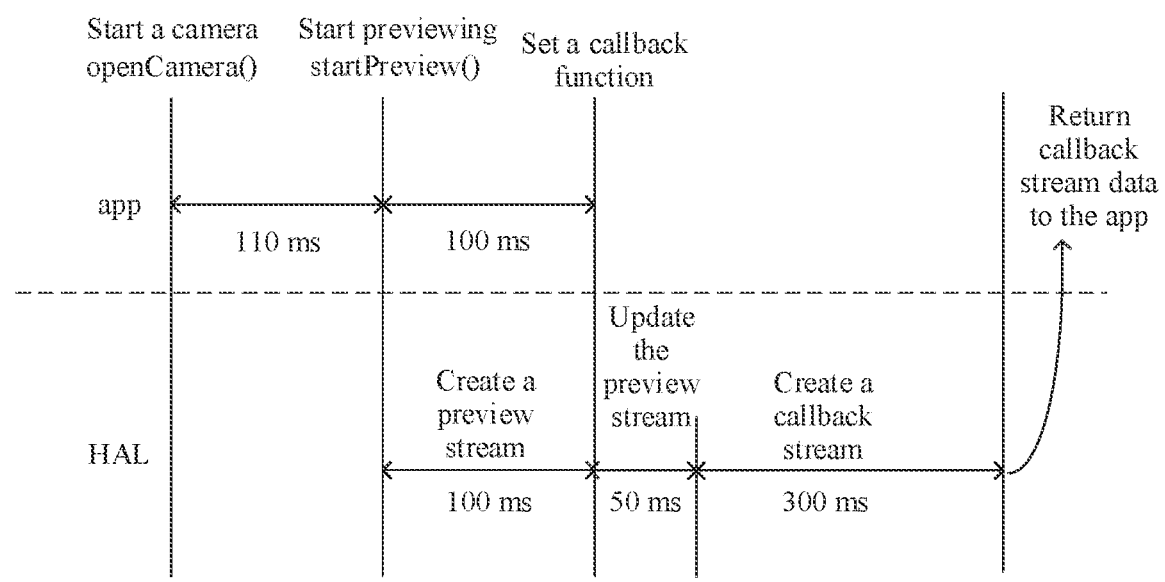

In the conventional technology shown in FIG. 1A to FIG. 1C, in the callback stream scenario, after starting the camera by using the app, the electronic device serially creates the preview stream and the callback stream, and may create the callback stream only after a relatively long time is elapsed after the preview stream is created. In this way, the callback stream data can be obtained. Therefore, it takes a long time for the app to perform processing based on the callback stream data, to implement a camera-related function of the app.

For example, in FIG. 1A to FIG. 1C, it takes about 110 ms to start the camera, about 100 ms to separately create and stop the preview stream, about 50 ms to update the preview stream, about 300 ms to create the callback stream, and about 360 ms to perform autofocusing. In this way, in FIG. 1A, duration from a moment at which the electronic device starts the camera by using the app to a moment at which the preview stream and the callback stream are successfully created and duration from the moment at which the electronic device starts the camera by using the app to a moment at which the app obtains the callback stream data each may be about 1070 ms. In FIG. 1B, duration from a moment at which the electronic device starts the camera by using the app to a moment at which the preview stream and the callback stream are successfully created and duration from the moment at which the electronic device starts the camera by using the app to a moment at which the app obtains the callback stream data each may be about 920 ms. In FIG. 1C, duration from a moment at which the electronic device starts the camera by using the app to a moment at which the preview stream and the callback stream are successfully created and duration from the moment at which the electronic device starts the camera by using the app to a moment at which the app obtains the callback stream data each may be about 560 ms.

Embodiments of this application provide a callback stream processing method. The method may be applied to an electronic device. After the electronic device starts a camera by using an app, if the electronic device determines that a current scenario is a callback stream scenario, when the app indicates to create a preview stream, an operating system may also create a callback stream, in other words, the electronic device may set the preview stream and the callback stream in parallel, so as to start the callback stream and obtain callback stream data in advance. Then, after the app sets a callback function, the electronic device may directly return, by using the callback function, the callback stream data obtained in advance to the app for processing. Therefore, compared with the conventional technology of serially creating a preview stream and a callback stream, a method for creating a preview stream and a callback stream in parallel provided in this embodiment of this application can shorten a time consumed by the electronic device for creating a preview stream and a callback stream, shorten a time consumed by the app for obtaining callback stream data, shorten a time consumed by the app for performing processing based on the callback stream data to implement a camera-related function, shorten a user waiting time, and improve user experience.

The camera-related function that can be implemented by the app invoking the camera to obtain the callback stream may include: code (two-dimensional code or bar code) scanning, video chatting, AR, smart object recognition, question scanning, bank card scanning, certificate scanning, and the like. For example, the app may be WeChat, Alipay, QQ, Facetime, Skype, Taobao, Meituan, or Jingdong.

For example, the electronic device may be a mobile phone, a tablet computer, a wearable device, a vehicle-mounted device, an augmented reality (AR) device/a virtual reality (VR) device, a notebook computer, an ultra-mobile personal computer (UMPC), a netbook, a personal digital assistant (PDA), or a smart household. A device type of the electronic device is not limited in this embodiment of this application.

Figure 2:
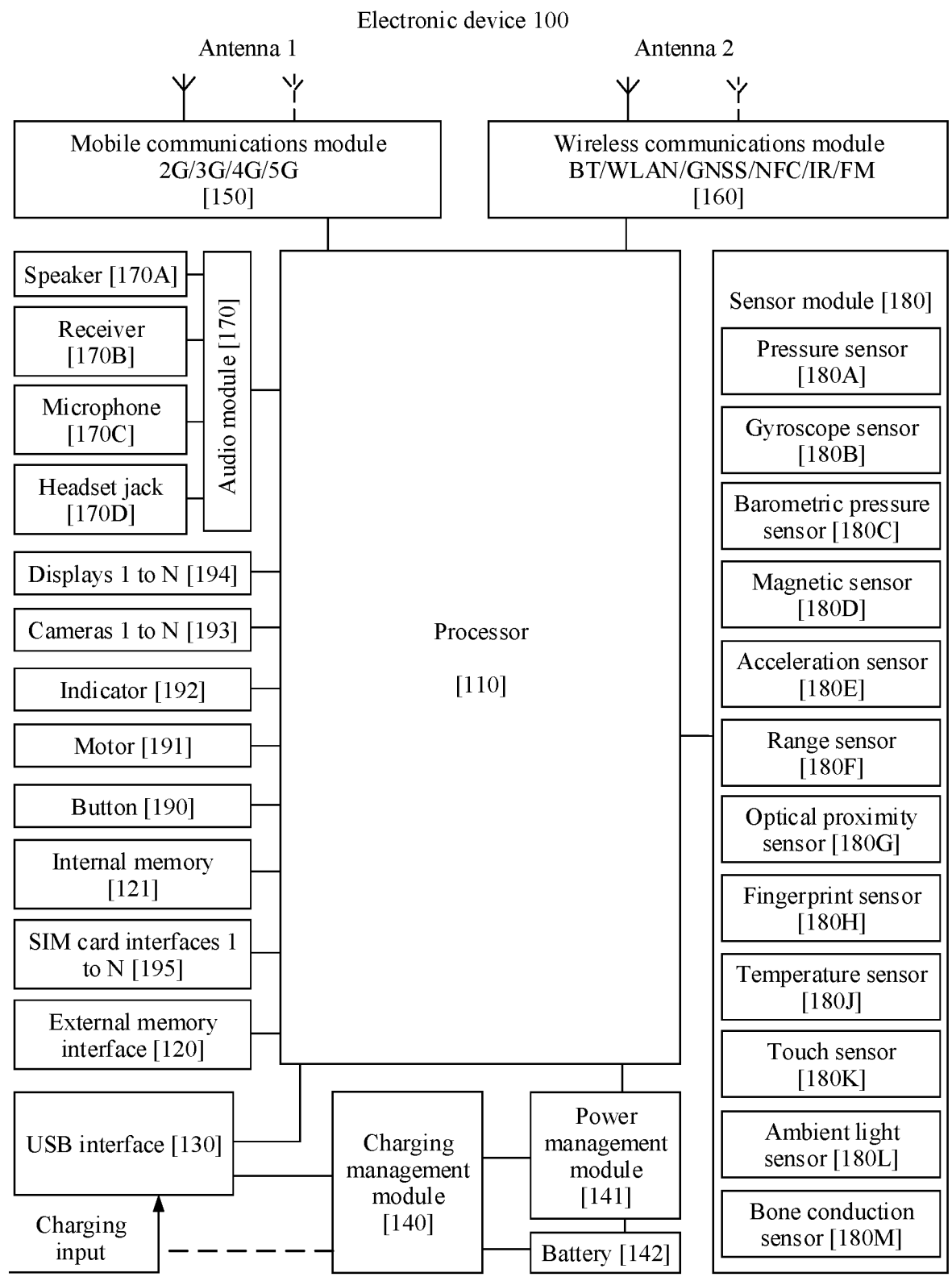
FIG. 2 is a schematic diagram of a structure of an electronic device according to an embodiment of this application.

For example, FIG. 2 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to USB standard specifications, and may be a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset for playing audio through the headset, or may be configured to connect to another electronic device such as an AR device.

It can be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner that is different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to increase antenna utilization. For example, the antenna 1 may be multiplexed as a diversity antenna in a wireless local area network. In some other embodiments, the antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

In this embodiment of this application, the display 194 may be configured to: display an interface of an application, display an interface after the application starts the camera, and the like.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193, also referred to as a camera, is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

In this embodiment of this application, the camera may capture image data, and return a preview stream and a callback stream to the electronic device 100.

The digital signal processor is configured to process a digital signal, and may further process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural network (NN) computing processor, quickly processes input information by referring to a structure of a biological neural network, for example, by referring to a mode of transmission between human brain neurons, and may further continuously perform self-learning. The electronic device 100 may implement applications such as intelligent cognition through the NPU, for example, image recognition, facial recognition, speech recognition, and text understanding.

The external memory interface 120 may be configured to connect to an external memory card such as a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a voice playing function or an image playing function), and the like. The data storage area may store data (such as audio data and a phone book) and the like created when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS).

In this embodiment of this application, the processor 110 may run the instructions stored in the internal memory 121. When an application invokes the camera, a preview stream and a callback stream are created in parallel in a callback stream scenario, so as to start the callback stream and obtain callback stream data in advance. Subsequently, after the application sets a callback function, the callback stream data obtained in advance is directly returned to the application for processing by using the callback function. This can shorten a time consumed for creating a preview stream and a callback stream, and shorten a time consumed by the application for obtaining callback stream data.

The electronic device 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may listen to music or answer a hands-free call through the speaker 170A.

The receiver 170B, also referred to as an "earpiece", is configured to convert an audio electrical signal into a sound signal. When the electronic device 100 answers a call or listens to a voice message, the receiver 170B may be placed near a human ear to listen to a voice.

The microphone 170C, also referred to as a "mike" or a "microphone", is configured to convert a sound signal into an electrical signal. When making a call or sending a voice message, a user may make a sound near the microphone 170C through the mouth, to enter a sound signal to the microphone 170C. At least one microphone 170C may be disposed in the electronic device 100. In some other embodiments, two microphones 170C may be disposed in the electronic device 100, to implement a noise reduction function in addition to a function of collecting a sound signal. In some other embodiments, three, four, or more microphones 170C may be alternatively disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects strength of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyroscope sensor 180B may be configured to determine a motion posture of the electronic device 100. In some embodiments, an angular velocity of the electronic device 100 around three axes (namely, axes x, y, and z) may be determined through the gyroscope sensor 180B. The gyroscope sensor 180B may be configured to perform image stabilization during photographing. For example, when the shutter is pressed, the gyroscope sensor 180B detects an angle at which the electronic device 100 shakes, and calculates, based on the angle, a distance for which a lens module needs to compensate, so that the lens cancels the shake of the electronic device 100 through a reverse motion, to implement image stabilization. The gyroscope sensor 180B may be further used in a navigation scenario and a motion-controlled gaming scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 can detect opening and closing of a flip cover based on the magnetic sensor 180D. Further, a feature such as automatic unlocking upon opening of the flip cover is set based on a detected opening or closing state of the flip cover.

The acceleration sensor 180E may detect a magnitude of an acceleration of the electronic device 100 in each direction (usually, on three axes). When the electronic device 100 is still, a magnitude and a direction of gravity may be detected. The acceleration sensor may be further configured to identify a posture of the electronic device, and is used in an application such as switching between a landscape mode and a portrait mode or a pedometer.

The range sensor 180F is configured to measure a distance. The electronic device 100 may measure a distance in an infrared manner or a laser manner. In some embodiments, in a photographing scenario, the electronic device 100 may measure a distance by using the range sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light through the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally because of a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 at a location different from that of the display 194.

For example, the touch sensor 180K may detect a touch operation of the user. The operation is performed to implement a camera-related function of the application, and the function needs to be implemented by starting the camera.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into the same SIM card interface 195. The plurality of cards may be of a same type or different types. The SIM card interface 195 is also compatible with different types of SIM cards. The SIM card interface 195 is also compatible with an external storage card. The electronic device 100 interacts with a network by using the SIM card, to implement a call function, a data communication function, and the like. In some embodiments, the electronic device 100 uses an eSIM, namely, an embedded SIM card. The eSIM card may be embedded into the electronic device 100, and cannot be separated from the electronic device 100.

In this embodiment of this application, the touch sensor 180K or another detection component may detect an operation that the user uses the camera-related function of the application, and the function needs to start the camera. After the application starts the camera, when the processor 110 determines that a current scenario is a callback stream scenario, a preview stream and a callback stream may be created in parallel, so as to start the callback stream and obtain callback stream data in advance. Subsequently, after the application sets a callback function, the callback stream data obtained in advance may be directly returned to the application for processing by using the callback function. This can shorten a time consumed by the electronic device for creating a preview stream and a callback stream, shorten a time consumed by the application for obtaining callback stream data, shorten an operation time consumed by the application for implementing the camera-related function, shorten a user waiting time, and improve user experience.

It may be understood that, to implement a callback stream processing function of the electronic device, the electronic device includes a corresponding hardware and/or software module for performing each function. With reference to algorithm operations of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, function modules of the electronic device may be obtained through division based on the foregoing method examples. For example, the function modules may be obtained through division based on the functions, or two or more functions may be integrated into one processing module. The integrated module may be implemented in a form of hardware. It should be noted that the module division in the embodiments is an example, and is merely logical function division. During actual implementation, another division manner may be used.

Figure 3:
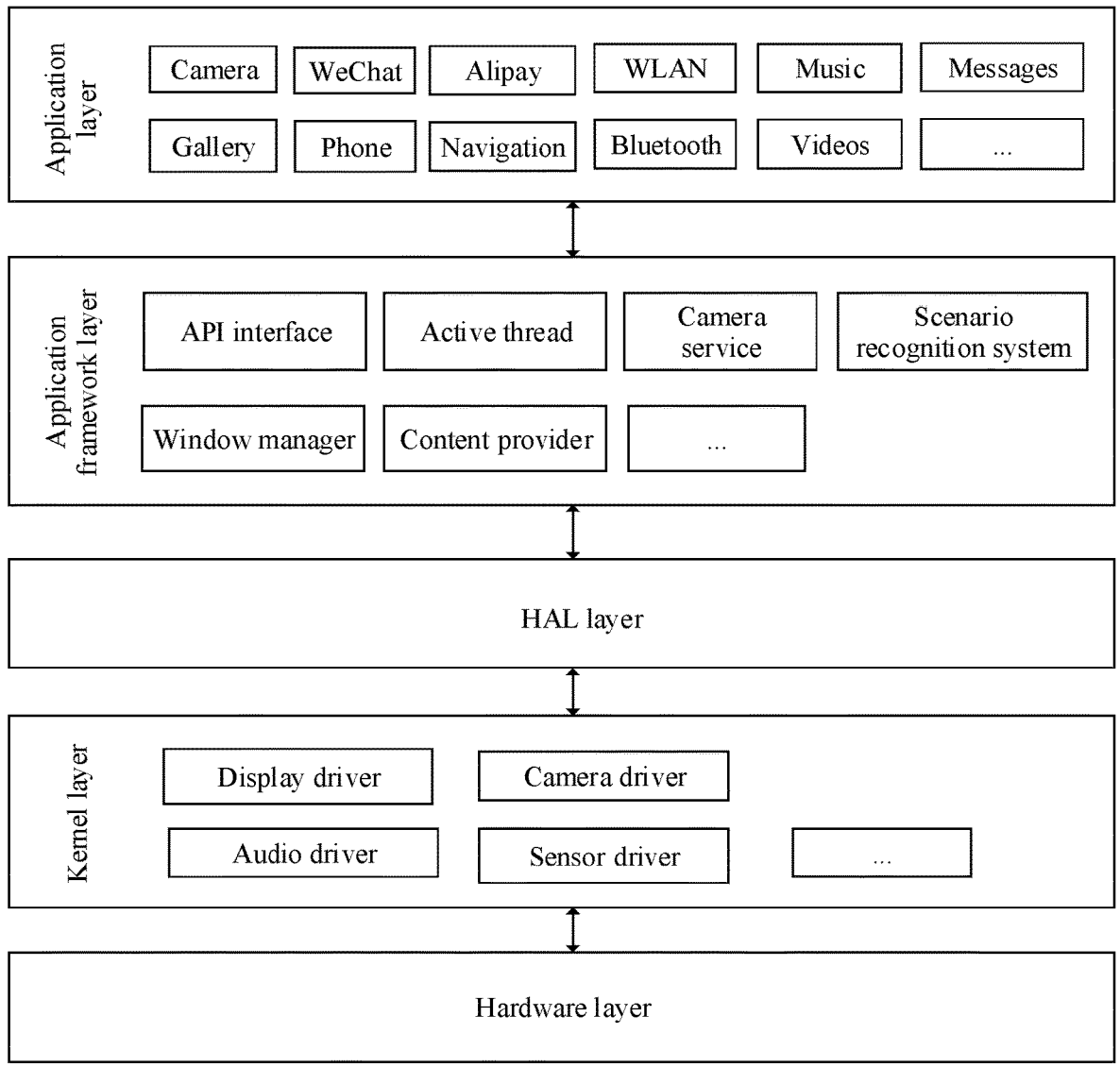
FIG. 3 is a schematic diagram of a structure of another electronic device according to an embodiment of this application.

For example, in a division manner, as shown in FIG. 3, the electronic device may include an application layer, an application framework layer, a HAL layer, a kernel layer, and a hardware layer. The application layer, the application framework layer, the HAL layer, and the kernel layer are software layers.

The application layer may include a series of application packages. For example, the application packages may include applications such as Camera, Gallery, Calendar, Phone, Maps, Navigation, WLAN, Bluetooth, Music, Videos, and Messages.

In the embodiments of this application, the application layer includes a first app that may invoke the camera to implement a first function. In addition, the first app needs to create a callback stream when invoking the camera. For example, the first app may be an application having functions such as code scanning, video chatting, AR, smart object recognition, question scanning, bank card scanning, or certificate scanning. For example, the first app may be Alipay, WeChat, QQ, Facetime, or Skype.

The application framework layer provides an application programming interface (API) and a programming framework for an application at the application layer. The application framework layer includes some predefined functions.

The application framework layer may include an activity thread (ActivityThread), a camera service (CameraService), and a scenario recognition system.

After an application is started, the operating system provides a corresponding activity thread at the application framework layer to support related scheduling, activity execution, broadcasting, and related activity management request operations of the application.

The camera service may be used to manage the camera. The management includes starting and stopping the camera, creating a preview stream and a callback stream, obtaining preview stream data and callback stream data, reporting callback stream data to an upper-layer application by using a callback function, and the like.

The scenario recognition system is configured to identify whether a current application scenario is a callback stream scenario.

The API interface at the application framework layer may include a first API interface between the activity thread and the scenario recognition system, a second API interface between the activity thread and the camera service, and the like.

In addition, the application framework layer may further include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes a visual control, such as a control for displaying a text or a control for displaying a picture. The view system may be configured to construct an application. A display interface may include one or more views. For example, a display interface including a notification icon of Messages may include a text display view and a picture display view.

The phone manager is configured to provide a communication function of the electronic device, for example, management of a call status (including answering, declining, or the like).

The resource manager provides various resources for an application such as a localized character string, an icon, a picture, a layout file, and a video file.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, an alert sound is played, the electronic device vibrates, or an indicator blinks.

The HAL layer is used to abstract underlying hardware and provide an abstracted unified camera service for the upper layer.

The kernel layer is a layer between hardware and software. The kernel layer includes a camera driver, a display driver, an audio driver, and a sensor driver.

The hardware layer includes hardware such as a camera, a display, a speaker, and a sensor. The camera is configured to capture a static image or a video. For example, in a code scanning scenario, the camera may collect an image picture of a two-dimensional code. An optical image of an object is generated through the lens, and is projected onto a photosensitive element. The photosensitive element may be a CCD or a CMOS phototransistor. The photosensitive element converts an optical signal into an electrical signal, and then transmits the electrical signal to the ISP for converting the electrical signal into a digital image signal. For example, the camera may be the camera 193 shown in FIG. 2.

An example in which the electronic device is a mobile phone having the structures shown in FIG. 2 and FIG. 3, the first function is a code scanning function, and the first app is WeChat is used below to describe a callback stream processing method provided in an embodiment of this application.

In some embodiments, the first API interface and the second API interface may be in a form of a software development kit (SDK). For example, the first API interface may be an HWSDK interface, and the second API interface may be a CameraSDK (or referred to as a camera SDK) interface.

Figure 4B:
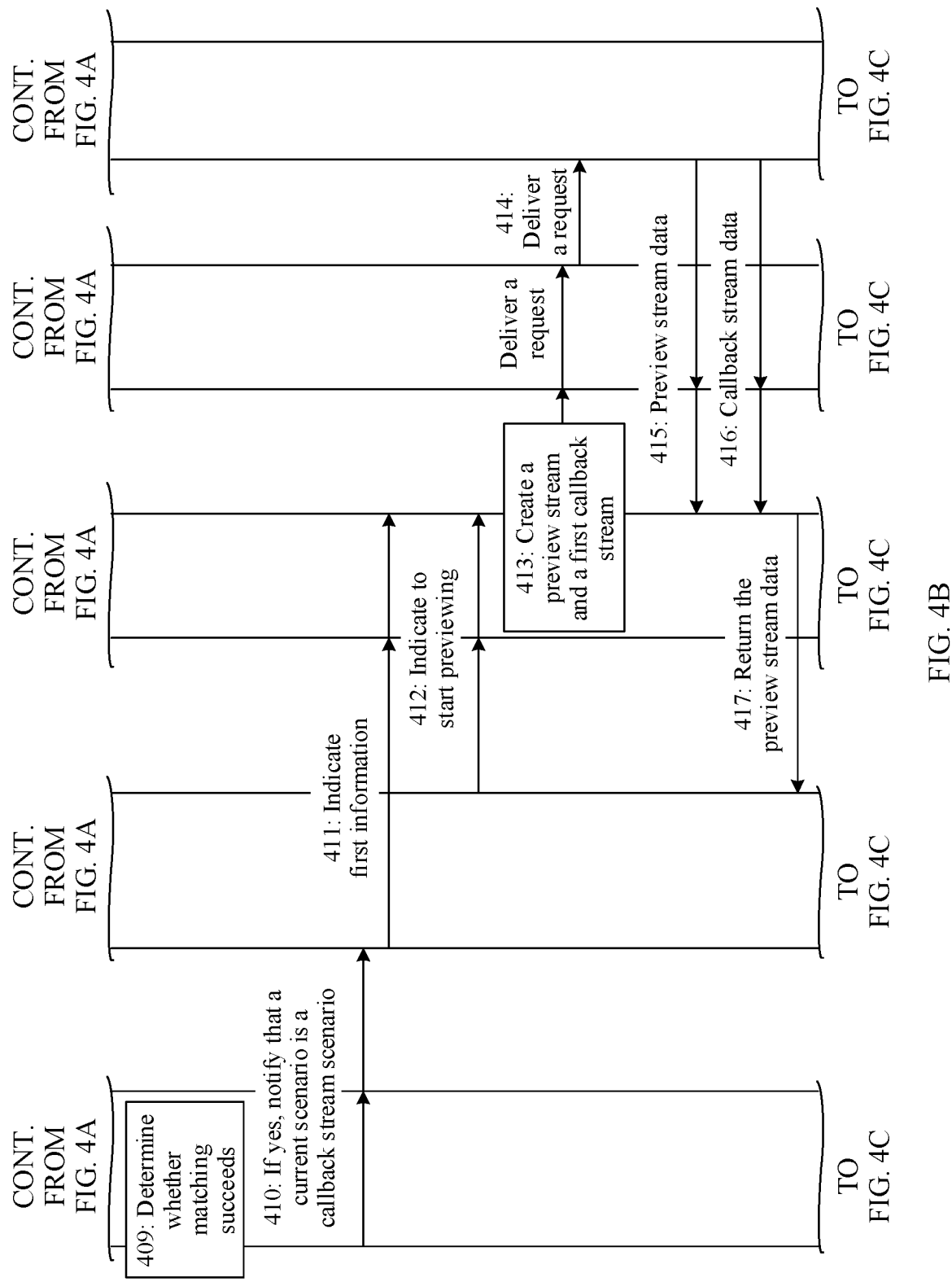

As shown in FIG. 4A to FIG. 4C, the callback stream processing method provided in this embodiment of this application may include the following operations.

401: After the mobile phone detects an operation that a user opens WeChat, an operating system generates an activity thread corresponding to WeChat.

The user may indicate to open WeChat in a plurality of manners, for example, may tap an icon of WeChat to open WeChat, or may open WeChat by using a voice indication, or may indicate to open WeChat by using an air gesture.

Figures 1, 11A:
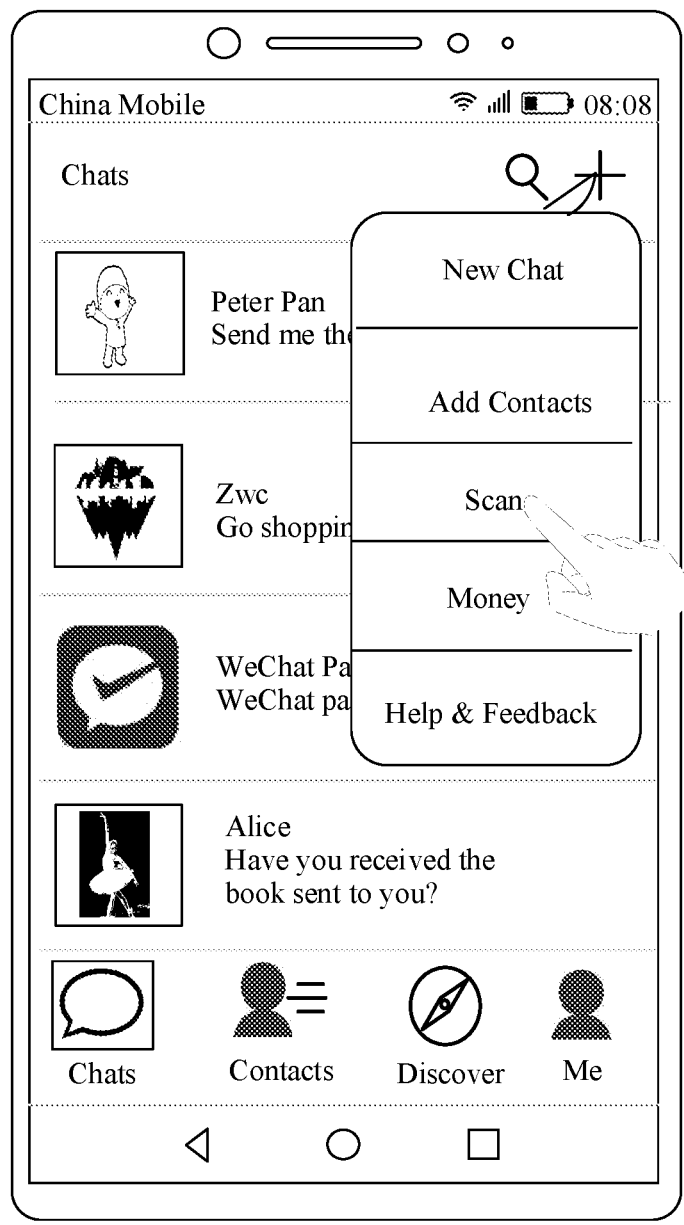
Figures 2, 11A:
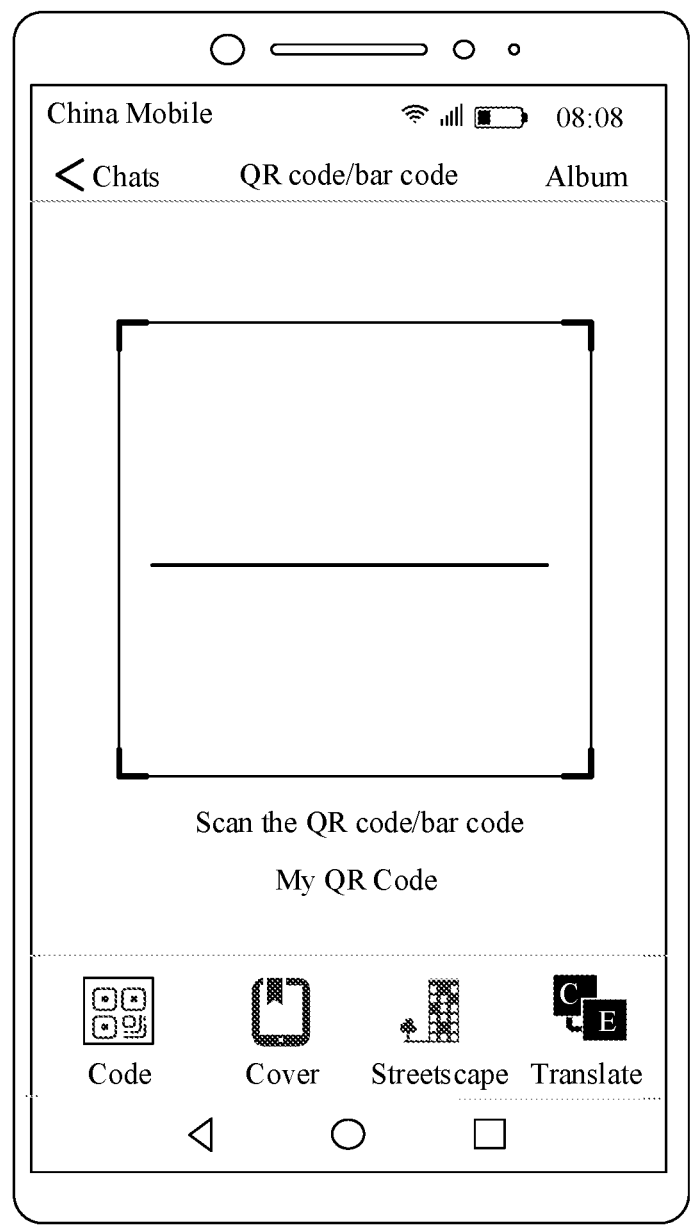
Figures 3, 11A:
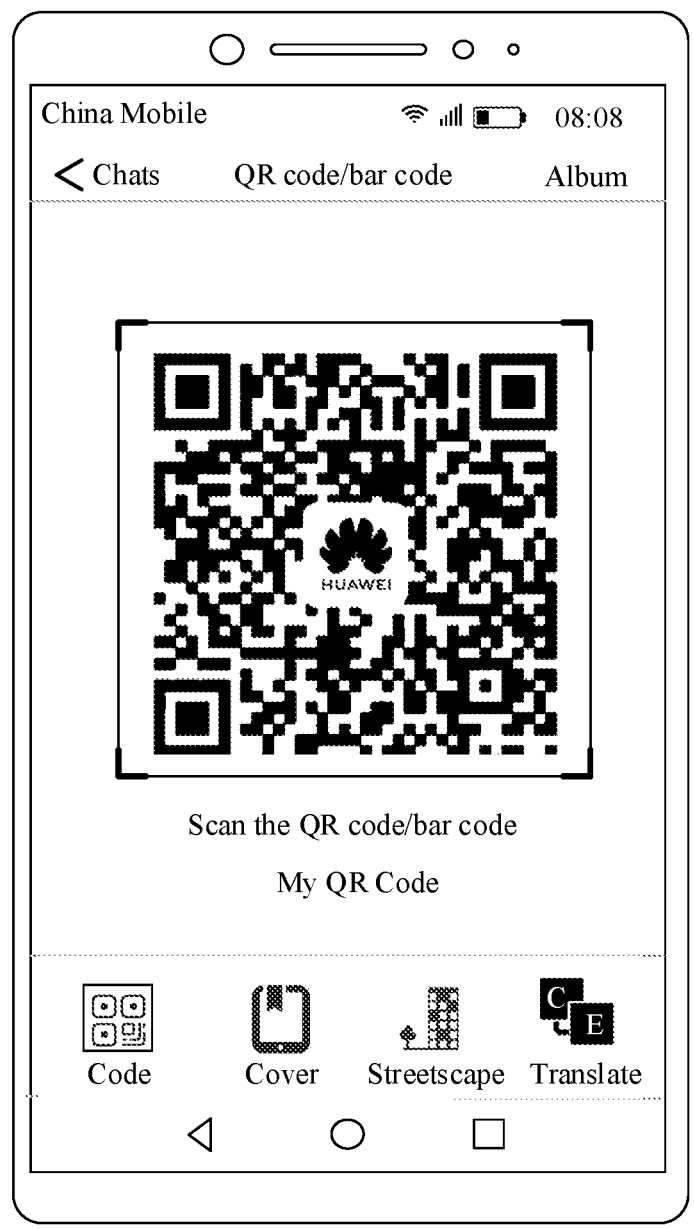
Figures 4, 11A:
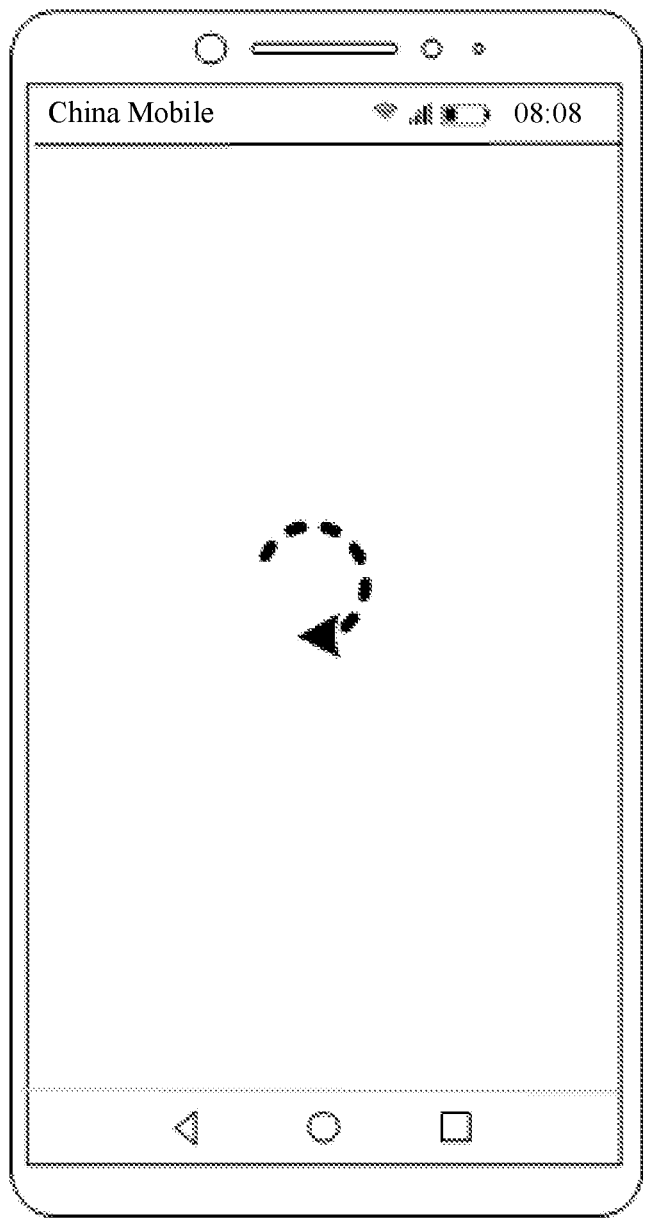
Figures 5, 11A:

For example, as shown in FIG. 5(*a*), the operation that the user opens WeChat may be an operation that the user taps a WeChat icon 501.

After the mobile phone detects the operation that the user opens WeChat, the operating system of the mobile phone may generate the activity thread corresponding to WeChat.

402: A screen displays a WeChat interface.

The screen may be the display 194 shown in FIG. 2, or may be the touchscreen formed by the display 194 and the touch sensor 180K. For example, for the WeChat interface displayed by the mobile phone, refer to FIG. 5(*b*).

403: The activity thread sends a first package name (packageName) corresponding to WeChat to a scenario recognition system through the HWSDK interface.

A package name is application identification information, and is used to uniquely identify an application. After the mobile phone opens WeChat, the activity thread may obtain the first package name corresponding to WeChat, and send the first package name to the scenario recognition system in the mobile phone.

404: The scenario recognition system searches for a reference scenario parameter group corresponding to the first package name.

The scenario recognition system includes a parameter matching library. The parameter matching library includes at least one scenario parameter group corresponding to a callback stream scenario. A scenario described by a scenario parameter group in the parameter matching library is a callback stream scenario. Each scenario parameter group includes one package name.

The scenario recognition system may store a large quantity of scenario parameter groups, and the scenario recognition system may select a relatively small quantity of reference scenario parameter groups including the first package name from the large quantity of scenario parameter groups.

The parameter matching library in the scenario recognition system may be integrated into a package file of a first app, and may be obtained with downloading of the first app.

Alternatively, a server may perform training and learning by using artificial intelligence AI, to obtain a parameter matching library corresponding to the callback stream scenario. The mobile phone may also request the server to obtain the parameter matching library. Alternatively, the parameter matching library may be periodically pushed by the server to the mobile phone, or may be pushed by the server to the mobile phone when a scenario parameter group corresponding to the callback stream scenario is updated.

Alternatively, the parameter matching library may be stored when the mobile phone identifies the callback stream scenario in a process in which the mobile phone is used. In addition, the parameter matching library may be further updated as the mobile phone continuously performs training and learning on the callback stream scenario.

405: WeChat starts a camera.

After receiving a first operation that the user uses a WeChat code scanning function, WeChat may invoke the openCamera interface to start the camera (that is, a camera application), so as to perform a code scanning operation by using the camera.

After starting the camera, WeChat may perform operation 412 to indicate to start previewing. A time from a moment at which WeChat starts the camera to a moment at which WeChat indicates to start previewing is t1. For example, t1 may be hundreds of milliseconds.

After starting the camera, WeChat may further perform operation 406 to operation 411 to determine whether a current scenario is the callback stream scenario. Duration from a moment at which WeChat starts the camera to a moment at which a result indicating whether the current scenario is the callback stream scenario is obtained is t2, and t2 is less than t1. For example, t2 may be several milliseconds. In this way, after determining that the current scenario is the callback stream scenario, the mobile phone may perform operation 412 and subsequent operations, so as to create a preview stream and a first callback stream in parallel.

406: After the mobile phone detects the first operation that the user uses the WeChat code scanning function, the screen displays, in response to the first operation, a first interface corresponding to the code scanning function.

For example, as shown in FIG. 5(*c*), the first operation that the user uses the WeChat code scanning function may be an operation that the user taps a Scan icon 502.

For example, as shown in FIG. 5(*d*), the first interface may be a code scanning interface displayed after the mobile phone enables the code scanning function.

407: The activity thread obtains a first scenario parameter group corresponding to the first interface.

The first scenario parameter group is used to describe a current scenario and status of the first interface. Each scenario parameter group may further include an activity name (activityName) in addition to the package name. The activity name may be used to identify an activity (Activity) corresponding to a currently displayed interface. Different combinations of package names and activity names can describe different interface scenarios. For example, the first scenario parameter group corresponding to the first interface includes the first package name and a first activity name.

Figure 6B:
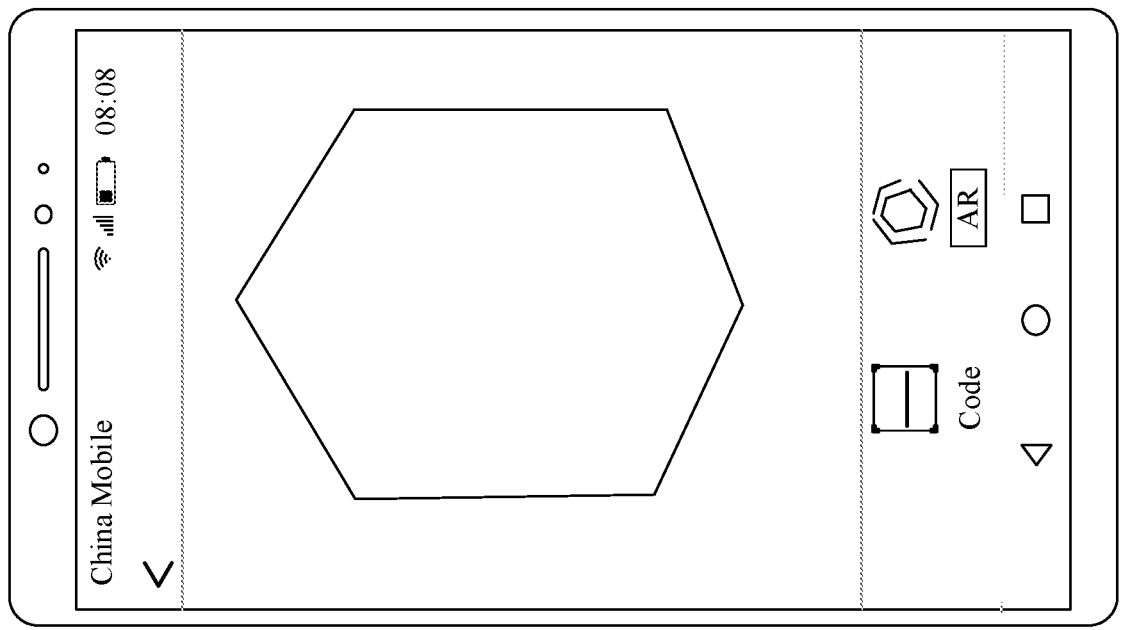
FIG. 6($a$) and FIG. 6($b$) are schematic diagrams of another group of interfaces according to an embodiment of this application.
Figure 6A:
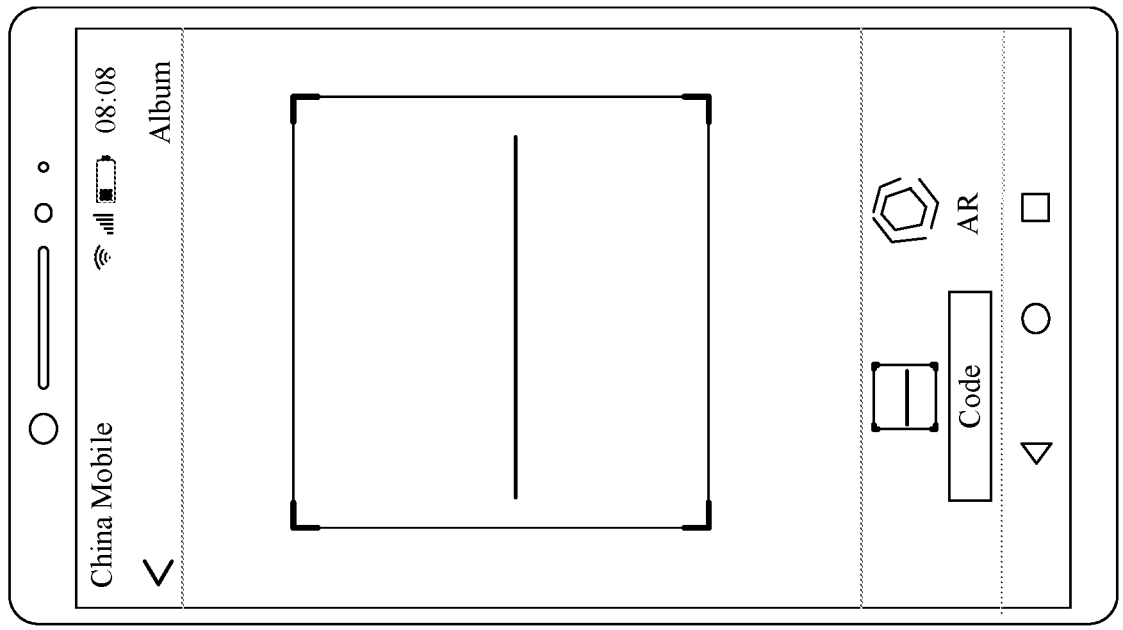

In some embodiments, a same package name and a same activity name may correspond to a plurality of interfaces of callback stream scenarios, and cannot uniquely identify an interface of a callback stream scenario. Therefore, the scenario parameter group may further include a fragment name (fragmentName) that is also referred to as a page name. For example, in another app, for a first interface corresponding to code scanning, refer to FIG. 6(*a*); and for a first interface corresponding to AR, refer to FIG. 6(*b*). The first interface corresponding to code scanning and the first interface corresponding to AR correspond to a same package name and a same activity name, but correspond to different page names. Therefore, the first scenario parameter group corresponding to the first interface includes the first package name, the first activity name, and a first page name.

408: The first activity thread sends the first scenario parameter group to the scenario recognition system through the HWSDK interface.

409: The scenario recognition system determines that the first scenario parameter group matches a scenario parameter group in the parameter matching library.

The first activity thread may send the first scenario parameter group corresponding to the first interface to the scenario recognition system, so that the scenario recognition system determines whether the first scenario parameter group matches a scenario parameter group in the parameter matching library.

On a basis that the relatively small quantity of reference scenario parameter groups including the first package name have been found in operation 403 and operation 404, the scenario recognition system may conveniently and quickly determine whether the reference scenario parameter groups include the first scenario parameter group, in other words, determine whether the first scenario parameter group matches a scenario parameter group in the parameter matching library.

In some embodiments, the mobile phone may not perform operation 403 and operation 404, and the mobile phone may sequentially determine, in operation 410, whether the first scenario parameter group matches a scenario parameter group in the parameter matching library.

410: If the scenario recognition system determines that the first scenario parameter group matches a scenario parameter group in the parameter matching library, the scenario recognition system notifies, through the first API interface, the activity thread that the current scenario is the callback stream scenario.

If the first scenario parameter group matches a scenario parameter group in the parameter matching library, it may indicate that a scenario corresponding to the first interface is a callback stream scenario.

If the scenario corresponding to the first interface is the callback stream scenario, the mobile phone may start a callback stream optimization procedure, so as to start a callback stream in advance.

411: The activity thread indicates first information to a camera service through the CameraSDK interface.

The first information may be used to indicate that the current scenario is the callback stream scenario, and indicate the camera service to start the callback stream optimization procedure, so as to start the callback stream in advance.

412: WeChat indicates to start previewing through the CameraSDK interface.

WeChat can invoke a startPreview( ) interface in the CameraSDK interface to indicate to start previewing.

413: After WeChat indicates to start previewing, the camera service creates the preview stream and the first callback stream in parallel based on the first information, and delivers a request for creating the preview stream and the first callback stream to a camera driver by using an HAL layer.

WeChat can invoke the startPreview( ) interface to indicate to start previewing, and notify the camera service through code internal processing logic. The camera service determines, based on the first information indicated by the activity thread, that the current scenario is the callback stream scenario, so as to start the callback stream optimization procedure, and create the preview stream and the first callback stream in parallel. In this way, before WeChat sets a callback function, the operating system may start the first callback stream in advance.

Figure 7A:
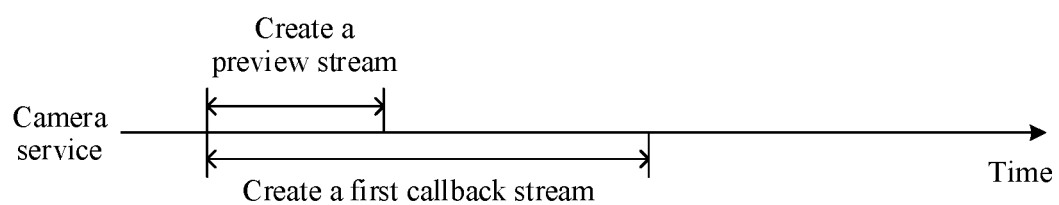
FIG. 7A is a schematic diagram of creating a preview stream and a callback stream according to an embodiment of this application.

That the camera service creates the preview stream and the first callback stream in parallel includes: As shown in FIG. 7A, the camera service simultaneously creates the preview stream and the first callback stream.

Figure 7B:
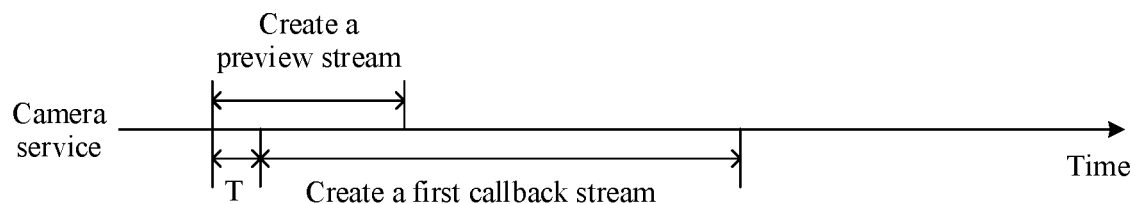
FIG. 7B is another schematic diagram of creating a preview stream and a callback stream according to an embodiment of this application.

Alternatively, that the camera service creates the preview stream and the first callback stream in parallel includes: After the camera service starts to create the preview stream, the camera service starts to create the first callback stream before creation of the preview stream is completed, in other words, a process of creating the preview stream and a process of creating the first callback stream overlap in terms of time. For example, as shown in FIG. 7B, duration between a moment of starting to create the first callback stream and a moment of starting to create the preview stream is T, and T is less than duration required for creating the preview stream, in other words, the process of creating the preview stream and the process of creating the first callback stream overlap in terms of time.

Figure 7C:
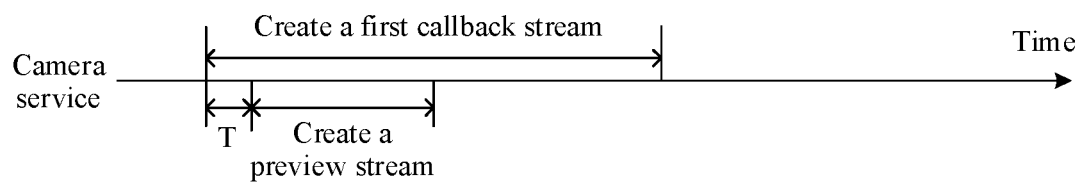
FIG. 7C is another schematic diagram of creating a preview stream and a callback stream according to an embodiment of this application.

Alternatively, that the camera service creates the preview stream and the first callback stream in parallel includes: After the camera service starts to create the first callback stream, the camera service starts to create the preview stream before creation of the first callback stream is completed, in other words, a process of creating the preview stream and a process of creating the first callback stream overlap in terms of time. For example, as shown in FIG. 7C, duration between a moment of starting to create the preview stream and a moment of starting to create the first callback stream is T, and T is less than duration required for creating the first callback stream, in other words, the process of creating the preview stream and the process of creating the first callback stream overlap in terms of time.

In some embodiments, the first information in operation 411 may be a flag (flag). The mobile phone sets the first callback stream based on the flag in operation 413. After operation 413, the mobile phone may delete the flag, so as to prevent the camera service from directly starting the callback stream in advance based on the flag in a non-callback stream scenario next time.

414: The camera driver delivers the request for creating the preview stream and the first callback stream to camera hardware.

415: The camera hardware correspondingly sets the preview stream, obtains preview stream data, and returns, to the camera service by using the HAL layer, the preview stream and a notification message indicating that the preview stream is successfully created.

A time from a moment of starting to create the preview stream to a moment of successfully creating the preview stream is particular, for example, may be about 100 ms. It may be understood that, after the preview stream is successfully created, the preview stream data is continuously obtained.

416: The camera hardware correspondingly sets the first callback stream, obtains callback stream data corresponding to the first callback stream, and returns, to the camera service by using the HAL layer, the callback stream data of the first callback stream and a notification message indicating that the first callback stream is successfully created.

A time from a moment of starting to create the first callback stream to a moment of successfully creating the first callback stream is also particular, for example, may be about 300 ms. It may be understood that, after the first callback stream is successfully created, the callback stream data of the first callback stream is continuously obtained.

417: The camera service returns the preview stream data to WeChat.

Figure 7D:
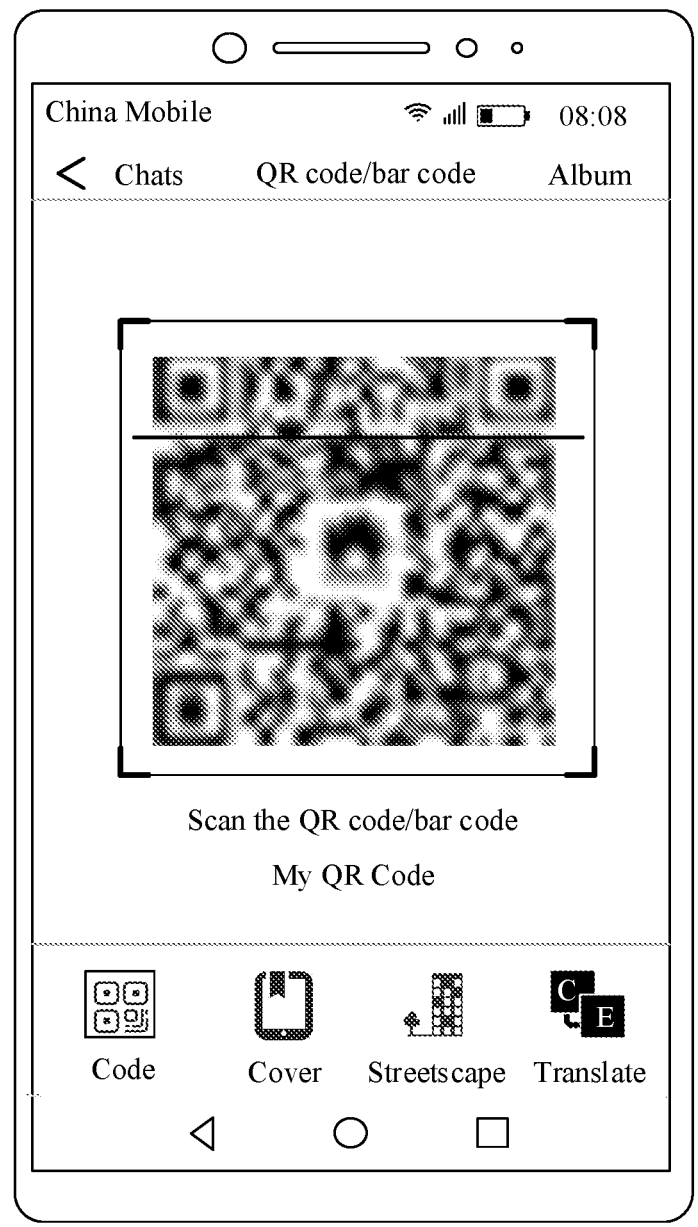
FIG. 7D is a schematic diagram of a code scanning view according to an embodiment of this application.

The camera service returns the preview stream data to WeChat, so that WeChat performs related processing based on the preview stream data. For example, WeChat may display a first image on the first interface based on the preview stream data. For example, for the first interface on which the first image is displayed, refer to FIG. 7D.

In one embodiment, the mobile phone may further perform initialization such as focusing based on service logic of the mobile phone. For example, the method may further include operation 418.

418: WeChat indicates to perform focusing through the CameraSDK interface.

WeChat can invoke an autoFocus( ) interface in the CameraSDK interface to indicate to perform autofocusing, and notify the camera service through the code internal processing logic. The camera service may indicate the camera hardware to perform focusing by using the HAL layer.

Figure 7E:
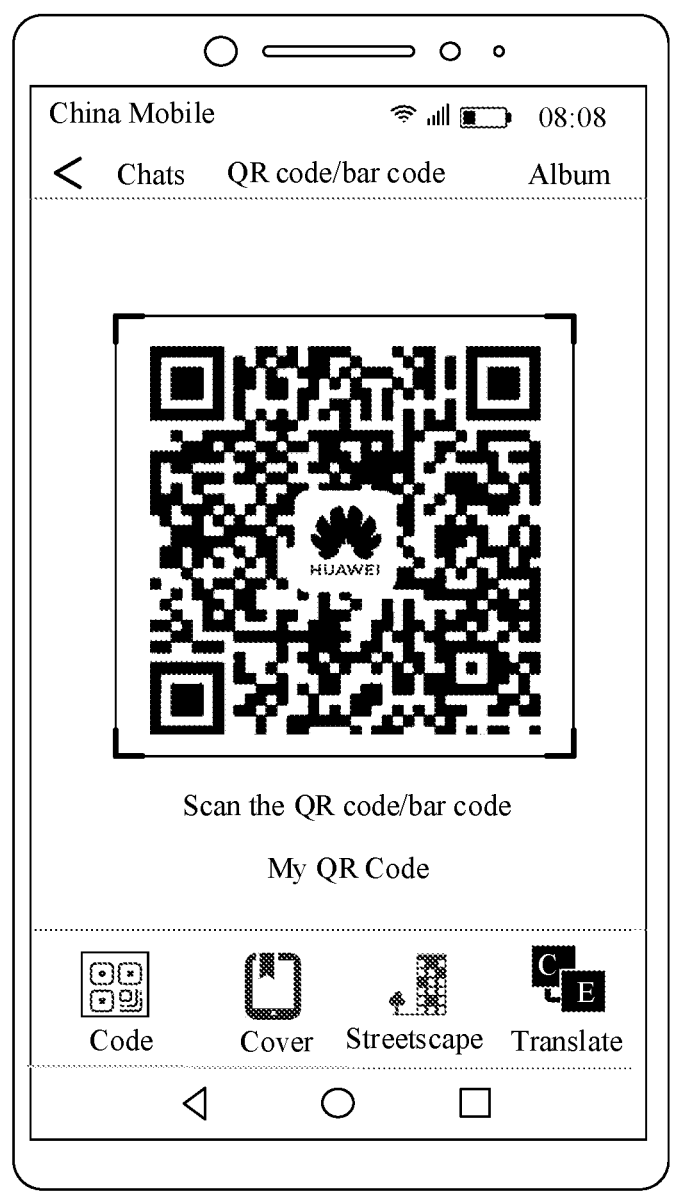
FIG. 7E is a schematic diagram of another code scanning view according to an embodiment of this application.

After the focusing is completed, WeChat may display a clear preview image to the user through the first interface after the focusing, in other words, latest preview stream data in the preview stream is data information of the clear image collected by the camera hardware. For example, for a second image displayed by the screen on the first interface after the focusing, refer to FIG. 7E.

After the focusing is completed, the second image displayed by WeChat based on the preview stream data includes a clear two-dimensional code image. Before the focusing is completed, the first image displayed by WeChat based on the preview stream data may include a blurred two-dimensional code image, or may include only a part of a two-dimensional code image, or may include a relatively clear two-dimensional code image. Correspondingly, the first image and the second image have different pixel values of two-dimensional code pixels.

419: WeChat sets the callback function through the CameraSDK interface.

WeChat may determine, based on service logic of WeChat, a moment of setting the callback function (for example, after the focusing is completed), and invoke a callback function interface in the CameraSDK interface at the moment to set the callback function. For example, the callback function interface may include a setCallback( ) interface, a setPreviewCallback( ) interface, a setOneShot-PreviewCallback( ) interface, or an addCallbackBuffer( ) interface.

420: The camera service directly returns, to WeChat by using the callback function, the callback stream data obtained after the first callback stream is created.

After invoking the callback function interface, WeChat may notify the camera service through the code internal processing logic. If the camera service determines that no callback stream is currently created, the camera service starts to create a callback stream. However, in this embodiment of this application, because the camera service determines that the first callback stream has been created, the camera service does not create a callback stream again and does not need to deliver a request for creating a callback stream to an underlying layer, but the camera service may directly return, to WeChat by using the callback function, the callback stream data obtained after the first callback stream is created in advance, so that WeChat performs processing. Therefore, after WeChat sets the callback function, the camera service does not create a callback stream again, and a time consumed for creating the callback stream again is not generated.

It should be noted that, after the first callback stream is successfully created, the callback stream data of the first callback stream is continuously obtained and updated before/after the focusing is completed. In a code scanning scenario, the callback stream data obtained before the focusing is completed may be invalid information corresponding to a blurred two-dimensional code image; or may include only partial two-dimensional code information; or may include complete two-dimensional code information, which is the same as the preview stream data obtained after the focusing is completed. However, before the focusing is completed, the callback stream data is not reported to the app. Therefore, the callback stream data obtained by the camera service can be discarded. After the focusing is completed, the latest callback stream data obtained by the camera service may be reported to WeChat for processing.

It may be understood that, in a scenario in which focusing is not required, for example, during video chatting, the callback stream data is continuously returned to a video chatting application, and is not discarded.

In this way, after the mobile phone starts the camera by using WeChat, if the mobile phone determines that the current scenario is the callback stream scenario, the mobile phone may create the first callback stream in parallel when WeChat indicates to create the preview stream, so that the first callback stream can be started and the callback stream data can be obtained in advance. Subsequently, after WeChat sets the callback function, the camera service does not create a callback stream again, but directly returns the previously obtained callback stream data to WeChat by using the callback function. Therefore, compared with the conventional technology of serially creating a preview stream and a callback stream, a method in which the mobile phone creates the preview stream and the first callback stream in parallel shortens a time consumed by the mobile phone for creating a preview stream and a callback stream, and shortens a time consumed by WeChat for obtaining callback stream data.

Figure 8A:
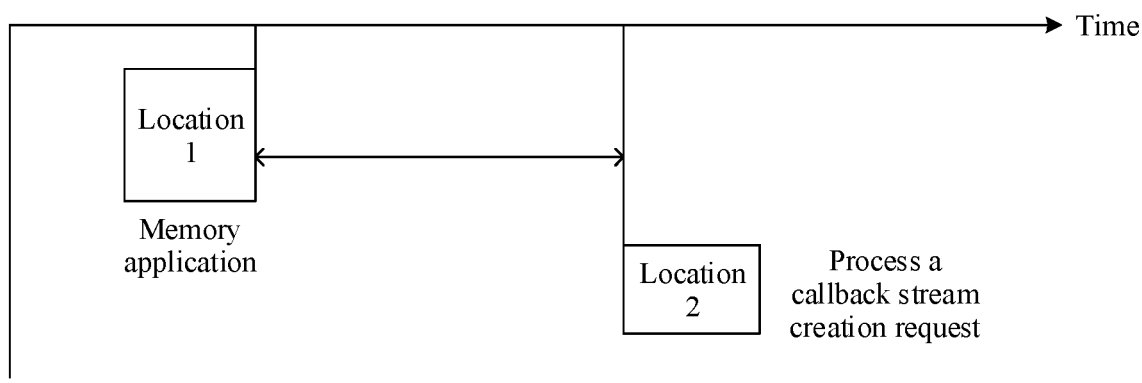
FIG. 8A is a sequence diagram of processing a callback stream request according to the conventional technology.
Figure 8B:
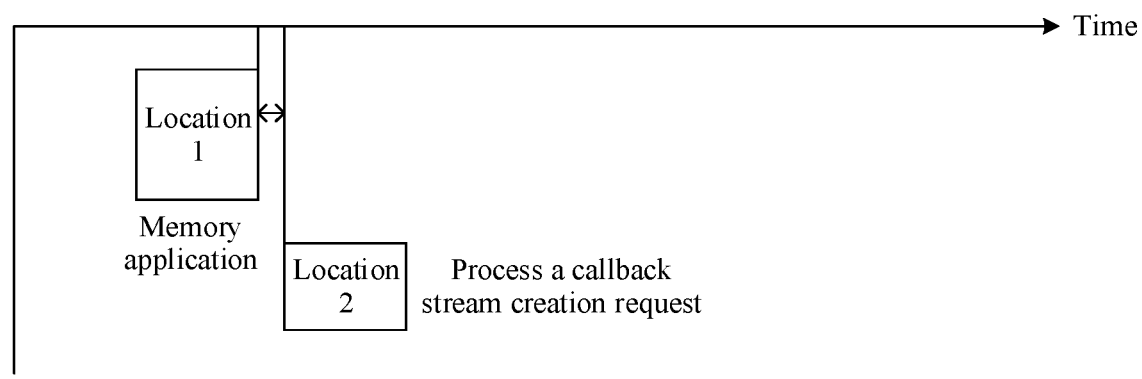
FIG. 8B is a sequence diagram of processing a callback stream request according to an embodiment of this application.

For example, FIG. 8A and FIG. 8B are diagrams of a working sequence of a processor of the mobile phone that is obtained by using a performance analysis tool of the mobile phone according to the conventional technology and according to an embodiment of this application respectively. A location 1 indicates a memory application operation performed after the camera is started, and a location 2 indicates an operation of processing a request for creating a callback stream. It can be learned by comparing FIG. 8A and FIG. 8B that, in the conventional technology, a callback stream starts to be created after a long time elapses after the camera is started, but in the method provided in this embodiment of this application, a callback stream is quickly created in advance after the camera is started.

421: WeChat processes the obtained callback stream data to implement the code scanning function.

After obtaining the callback stream data, WeChat may perform processing such as recognition, to implement the code scanning function of WeChat. A two-dimensional code records data symbol information by using a black-and-white graph that is distributed on a plane (a two-dimensional direction) according to a geometry rule. WeChat may parse a black-and-white pixel matrix of the two-dimensional code image displayed based on the callback stream data, to obtain data symbol information corresponding to the black-and-white pixel matrix, so as to perform further processing such as recognition and linking based on the data symbol information.

422: The screen displays a second interface after the code scanning succeeds.

Figure 9:
FIG. 9 is a schematic diagram of an interface displayed after code scanning succeeds according to an embodiment of this application.

For example, the mobile phone scans a two-dimensional code of a Huawei recruitment official account, and a second interface displayed after the code scanning succeeds may be a Huawei recruitment official account page shown in FIG. 9.

In the solution described in operation 401 to operation 422, the mobile phone sets the preview stream and the first callback stream in parallel. After WeChat indicates to set the callback function, the camera service does not need to create a callback stream again, but directly returns the callback stream data of the previously created callback stream to WeChat. It takes a relatively short time for the mobile phone to create the preview stream and the callback stream, and it takes a relatively short time for WeChat to obtain the callback stream data. However, in the conventional technology, the mobile phone serially sets the callback stream after creating the preview stream, and a time interval of serially creating the preview stream and the callback stream may be relatively long. Therefore, it takes a relatively long time for WeChat to obtain the callback stream data.

Figure 10A:
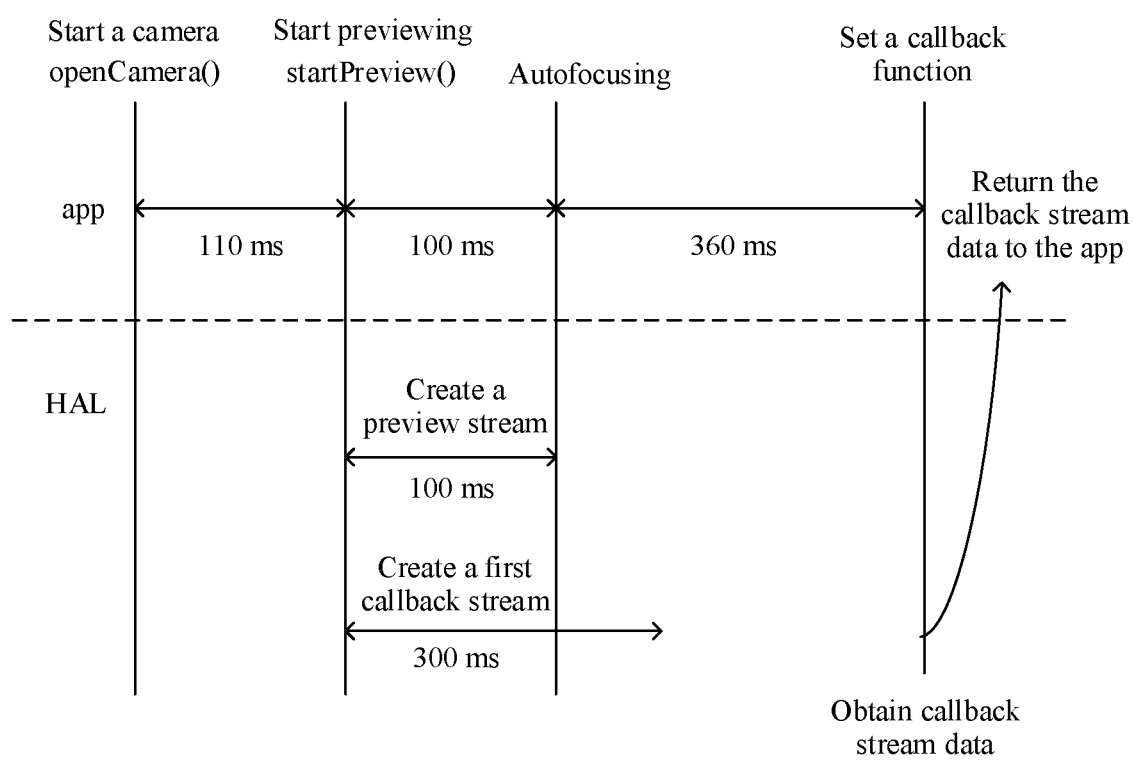
FIG. 10A and FIG. 10B are schematic diagrams of creating a preview stream and a callback stream according to an embodiment of this application.

For example, through comparison between the callback stream processing procedures shown in FIG. 1A and FIG. 1B, for the callback stream processing procedure provided in this embodiment of this application, refer to FIG. 10A. In a case shown in FIG. 10A, duration from a moment at which the mobile phone starts the camera by using an application to a moment at which a preview stream and a callback stream are successfully created may be about 410 ms, and duration from the moment at which the mobile phone starts the camera by using the application to a moment at which the application obtains callback stream data is about 570 ms, where 410 ms and 570 ms are significantly less than 1070 ms and 920 ms.

Figure 10B:
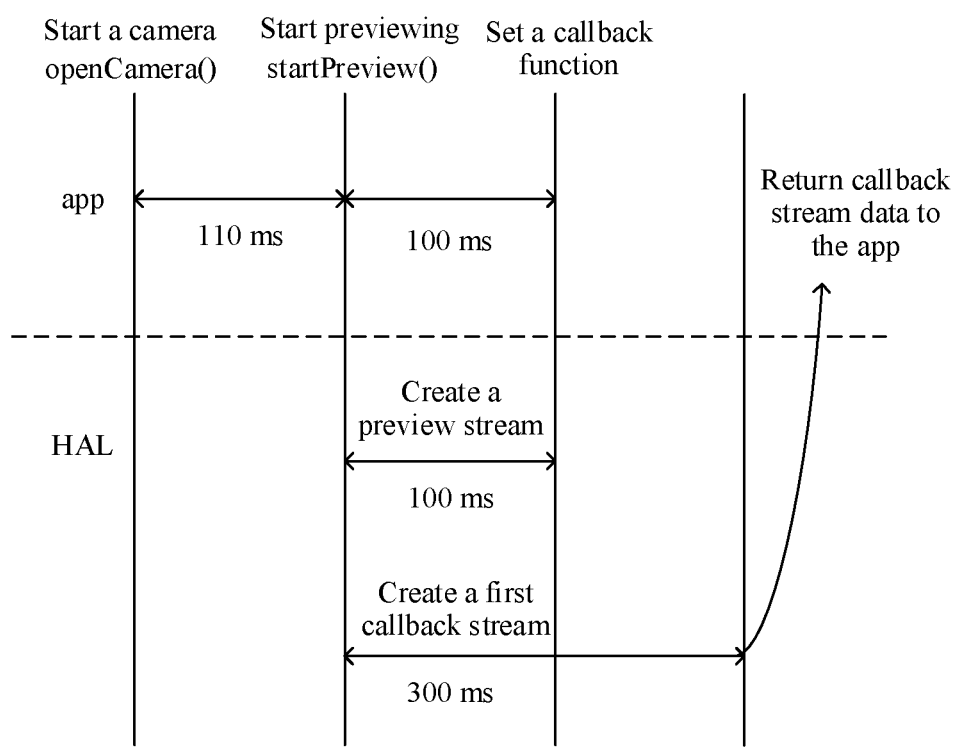

Through comparison with the callback stream processing procedure shown in FIG. 1C, for the callback stream processing procedure provided in this embodiment of this application, refer to FIG. 10B. In a case shown in FIG. 10B, duration from a moment at which the mobile phone starts the camera by using an application to a moment at which a preview stream and a callback stream are successfully created and duration from the moment at which the mobile phone starts the camera by using the application to a moment at which the application obtains callback stream data each may be about 410 ms that is significantly less than 560 ms.

It can be learned from comparison with the conventional technology of serially setting a preview stream and a callback stream that, this embodiment of this application of creating a preview stream and a callback stream in parallel can shorten a time for creating a preview stream and a callback stream, shorten a time consumed by an application for obtaining callback stream data, and accelerate a code scanning process.

Figures 1, 11B:
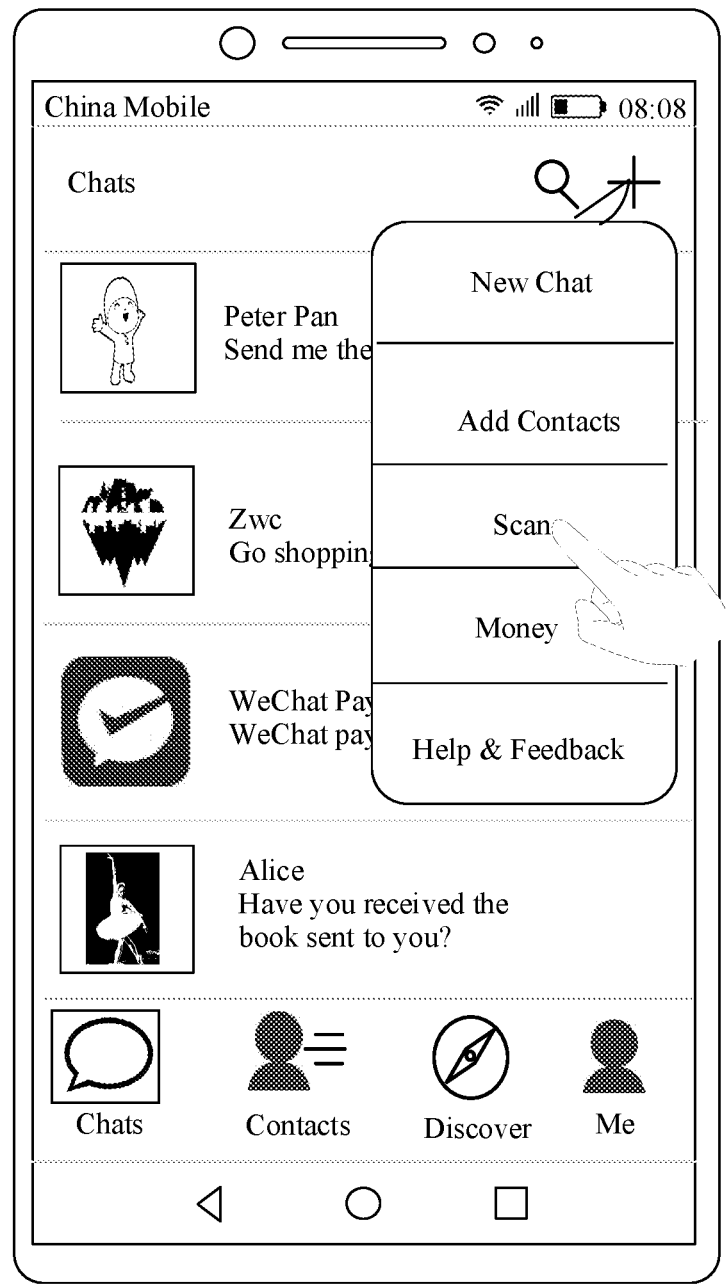
Figures 2, 11B:
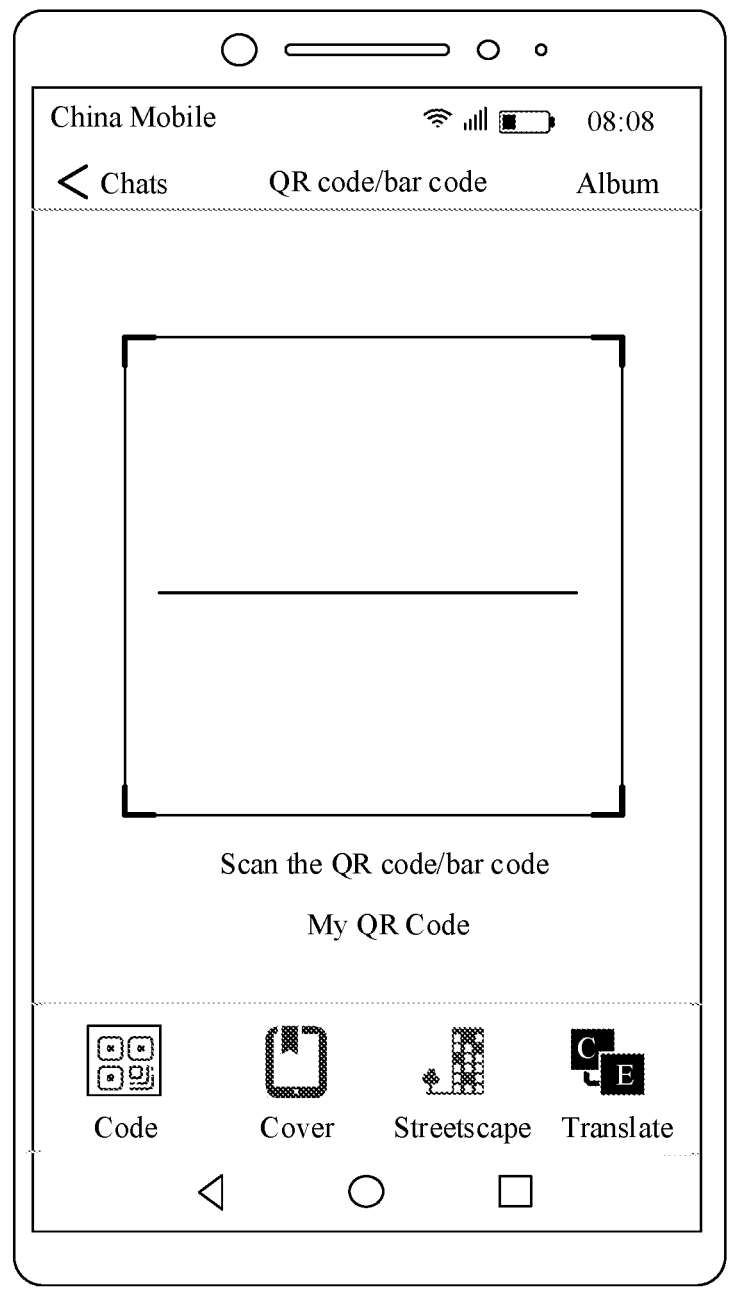
Figures 3, 11B:
Figures 4, 11B:

For example, in a code scanning scenario, for a sequence diagram of a code scanning process corresponding to the conventional technology, refer to FIG. 11A-1 to FIG. 11A-5; and for a sequence diagram of a code scanning process corresponding to the method provided in this embodiment of this application, refer to FIG. 11B-1 to FIG. 11B-4. It can be learned from comparison between FIG. 11A-1 to FIG. 11A-5 and FIG. 11B-1 to FIG. 11B-4 that the method provided in this embodiment of this application can make a code scanning time shorter and a code scanning speed faster.

Therefore, in the solution provided in this embodiment of this application, after the mobile phone starts the camera by using WeChat, if the mobile phone determines that the current scenario is the callback stream scenario, the mobile phone may create the first callback stream in parallel when WeChat indicates to create the preview stream, so that the callback stream data can be obtained in advance. Subsequently, after WeChat sets the callback function based on service processing logic of WeChat, the camera service does not create a callback stream again, but may directly return the previously obtained callback stream data to WeChat by using the callback function. Therefore, compared with the conventional technology of serially creating a preview stream and a callback stream, a method in which the mobile phone creates a preview stream and a callback stream in parallel shortens a time consumed by WeChat for creating a preview stream and a callback stream, shortens a time consumed by WeChat for obtaining callback stream data, shortens a time consumed by WeChat for performing processing based on the callback stream data to implement a callback stream service such as code scanning, shortens a waiting time consumed by the user for using a function such as code scanning, and improves user experience.

In addition, if the parameter matching library on the mobile phone is empty (for example, no parameter matching library is set on the mobile phone), or if the parameter matching library does not include the first scenario parameter group, the scenario recognition system determines, in operation 409, that the first scenario parameter group does not match a scenario parameter group in the parameter matching library. In this case, the mobile phone may create a preview stream or create a preview stream and a second callback stream based on a procedure in the conventional technology, and further implement a related function based on obtained data.

In a subsequent procedure, if the first app creates the second callback stream based on service logic of the first app, it may indicate that the first interface is a callback stream service scenario, and the mobile phone may not have been trained and learned, or the parameter matching library does not include the first scenario parameter group through learning. Therefore, the mobile phone may store the first scenario parameter group in the parameter matching library, to determine, next time based on the first scenario parameter group stored in the parameter matching library, the interface scenario corresponding to the first scenario parameter group is the callback stream scenario, so as to quickly start the callback stream in advance.

The foregoing descriptions are mainly based on an example in which the callback stream scenario is a code scanning scenario. The callback stream processing method provided in this embodiment of this application may be further applied to another callback stream scenario. For example, in a Skype video chatting scenario, the callback stream processing method provided in this embodiment of this application can also shorten a time consumed by the mobile phone for creating a preview stream and a callback stream, shorten a time consumed by a Skype application for obtaining callback stream data, enable the Skype application to perform processing such as coding, compression, and uploading on the callback stream data more quickly, shorten a processing time of Skype, enable a chatting peer end to quickly receive image data sent by a local end, improve real-time performance of an image displayed by the peer end in the chatting process, and also improve user experience.

Figure 12:
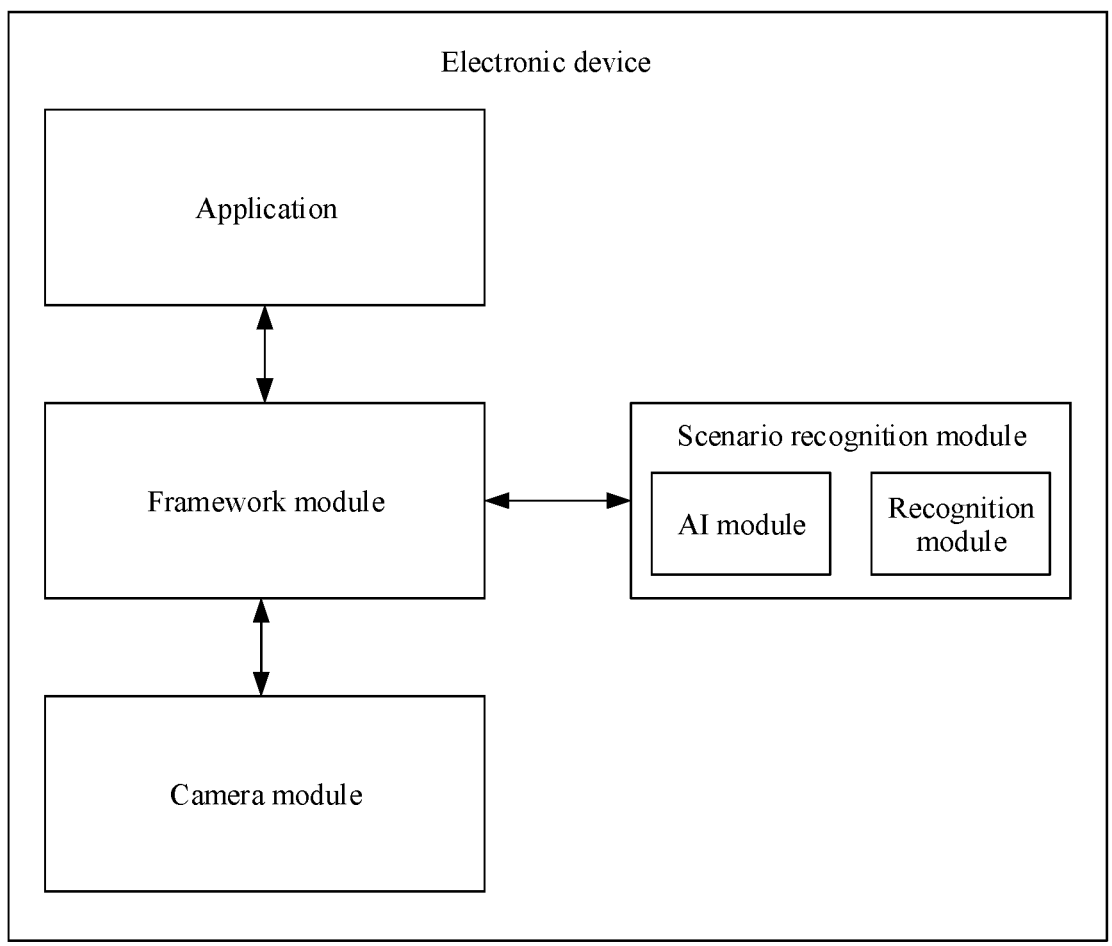
FIG. 12 is a schematic diagram of a structure of another electronic device according to an embodiment of this application.

For another example, in another division manner, as shown in FIG. 12, the electronic device may include an application, a framework module, a camera module, and a scenario recognition module.

The application may be the foregoing first app. The framework module may include a plurality of API interfaces, and may provide a basic framework for the application. In addition, each collaboration between the modules is completed by the framework module.

In one embodiment, the application may invoke an API interface of the framework module to start a camera. The framework module may transfer a current interface scenario to the scenario recognition module, and obtain a scenario recognition result indicating whether the current interface scenario is a callback stream scenario. The framework module determines, based on the scenario recognition result, whether to start a callback stream optimization procedure. If the framework module determines to start the callback stream optimization procedure, the framework module indicates the camera module to start the callback stream optimization procedure. In addition, the framework module may further receive a preview data stream and a callback data stream that are uploaded by the camera module, and upload the preview data stream and the callback data stream to the application for use and processing.

The scenario recognition module may include an AI module and a recognition module. The AI module may be configured to: train a scenario parameter group of a callback stream scenario, and store a training result in a parameter matching library. The recognition module may be configured to: identify the callback stream scenario based on a first scenario parameter group provided by the framework module and a scenario parameter group in the parameter matching library, and return a corresponding recognition result to the framework module.

The camera module may include a camera service, a HAL layer, a driver, and hardware. The camera module is configured to: capture an image and data by using a camera-related function of the application, return the image and the data to the framework module, and implement the callback stream optimization procedure.

The callback stream optimization procedure includes: setting identification information after the camera service receives a notification that the framework module enables optimization. After the framework module enters a preview procedure, the camera service starts the callback stream optimization procedure, creates a preview stream and a callback stream in parallel, sends a request for creating the preview stream and the callback stream to the driver through the HAL layer, and waits for return of preview stream data and callback stream data.

The foregoing mainly describes the callback stream processing method provided in this embodiment of this application from the perspective of the modules of the electronic device. An operation performed by each module of the electronic device is an operation performed by the electronic device. From the perspective of the electronic device, the electronic device may perform the callback stream processing method provided in the foregoing embodiment of this application by using a procedure shown in FIG. 13. The method may include the following operations.

1301: The electronic device displays an interface of a first application.

Figure 5A:
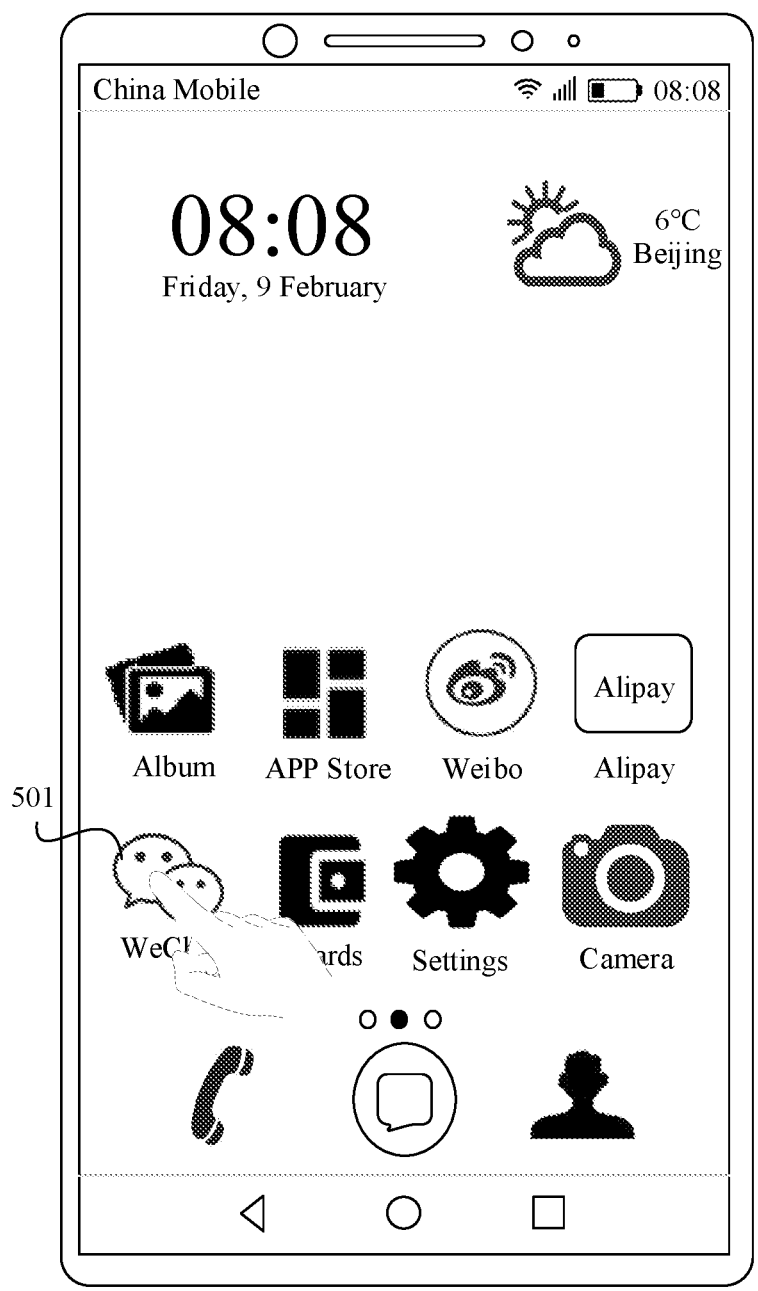
FIG. 5($a$) to FIG. 5($d$) are schematic diagrams of a group of interfaces according to an embodiment of this application.
Figure 5B:
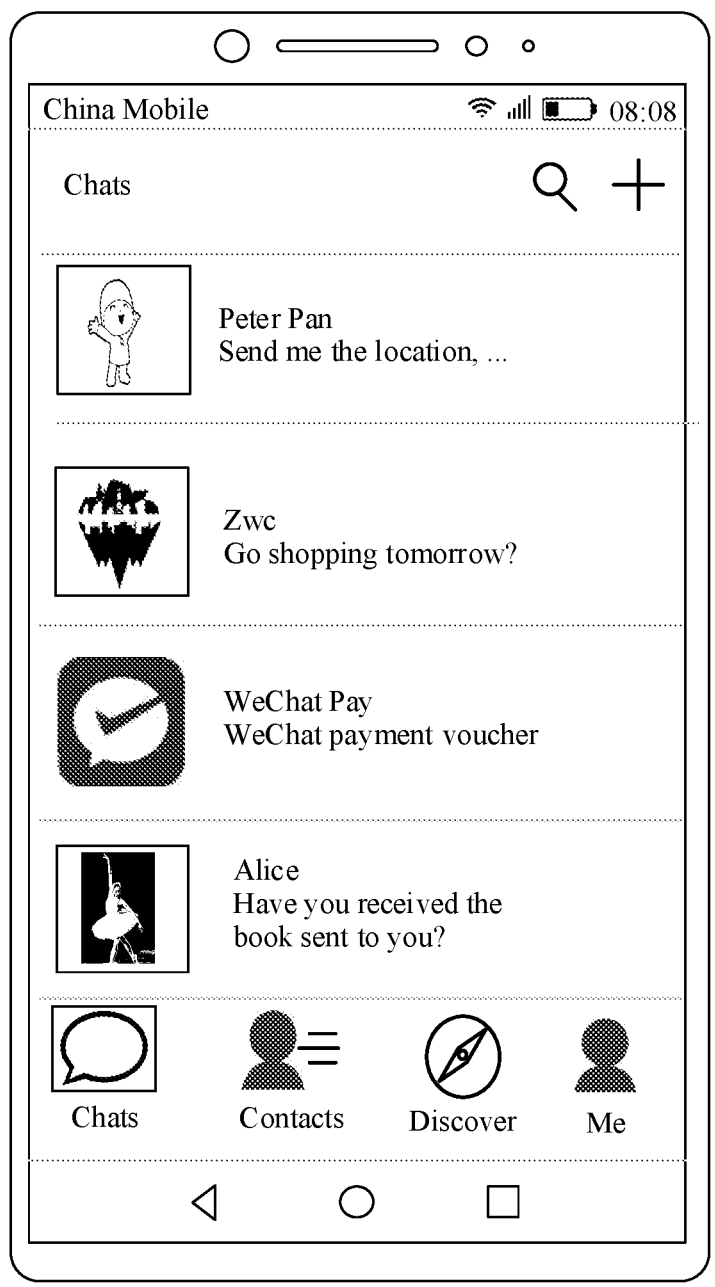

For example, the first application may be WeChat, and the interface of the first application may be the interface shown in FIG. 5(b).

1302: The electronic device detects a first operation that a user uses a first function of the first application.

Figure 5C:
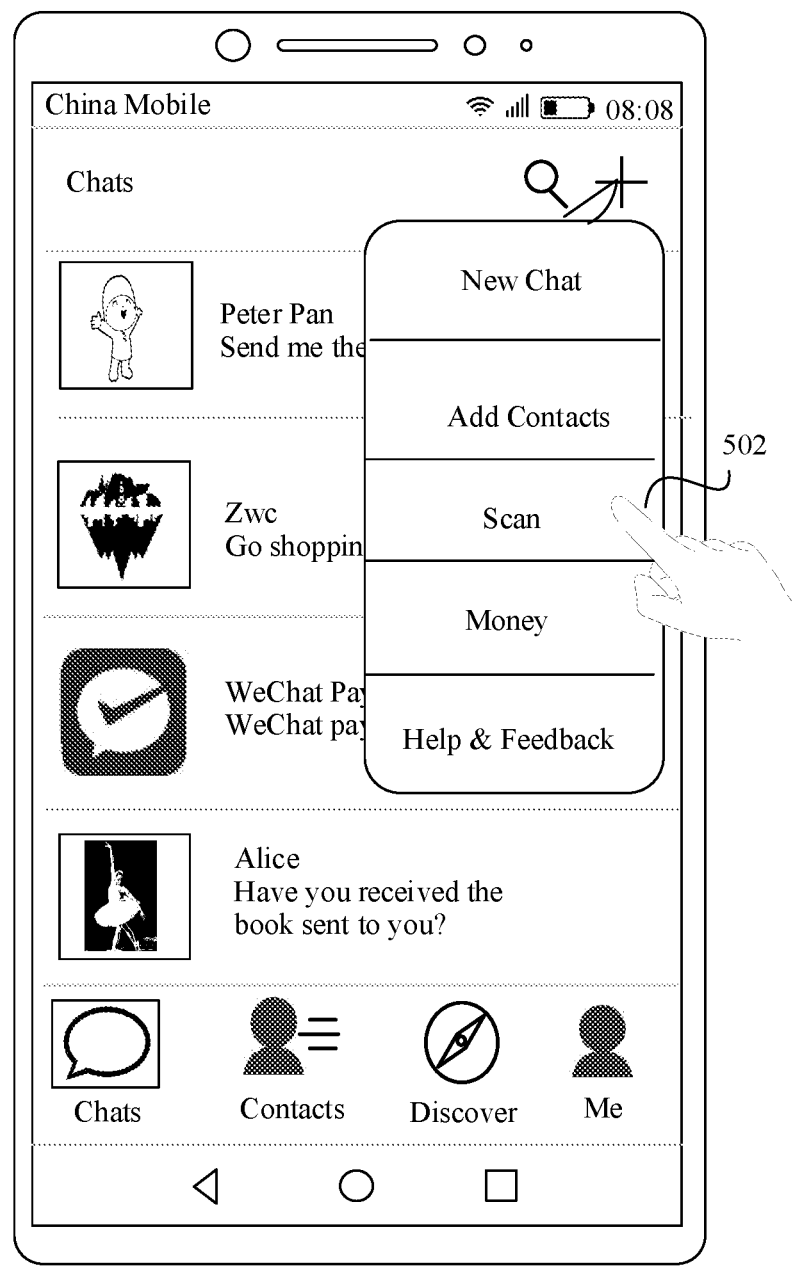

For example, the first application may be WeChat, the first function may be the code scanning function, and the first operation may be the operation that the user taps the Scan control 502 shown in FIG. 5(c).

1303: The electronic device starts a camera application in response to the first operation.

1304: The electronic device displays a first interface corresponding to the first function.

Figure 5D:
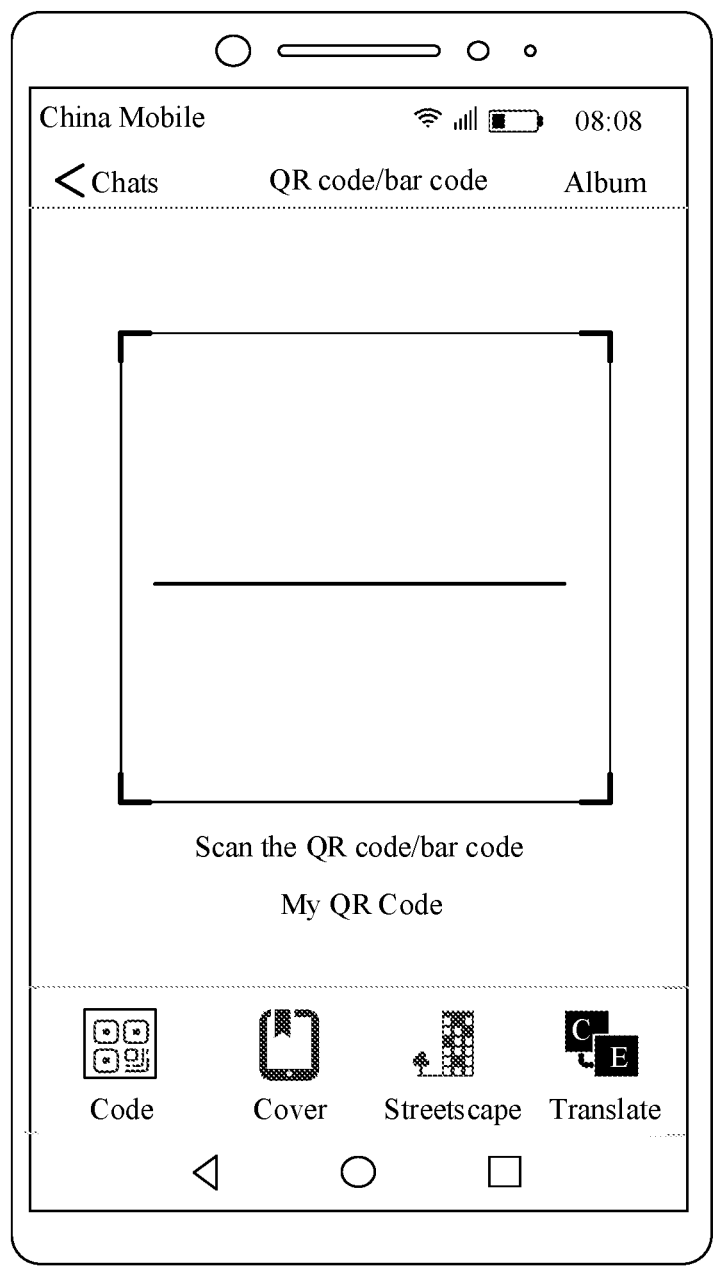

For example, the first interface may be the code scanning view shown in FIG. 5(d).

1305: The electronic device creates a preview stream and a first callback stream in parallel.

1306: The electronic device obtains first data, where the first data is callback stream data corresponding to the first callback stream.

1307: The electronic device sets a callback function.

1308: The electronic device provides, by using the callback function, the first data for the first application for processing, to implement the first function.

In some embodiments, the method may further include the following operation.

1309: The electronic device displays a second interface after implementing the first function.

For example, the second interface may be the interface in FIG. 9 displayed after code scanning succeeds. In a video chatting scenario or another callback stream scenario, after the first function is implemented, the second interface may not be displayed.

For descriptions of operation 1303 to operation 1309, refer to related descriptions of operation 405 to operation 422. Details are not described herein again.

In some other embodiments, the mobile phone may alternatively display, in a case in which the mobile phone does not display the interface of the first application, the first interface corresponding to the first function in response to the first operation that the user uses the first function of the first application. The first interface is an interface corresponding to a camera-related function of the first application. In other words, the mobile phone may not perform operation 1301, but directly performs operation 1302 to operation 1309.

Figure 14:
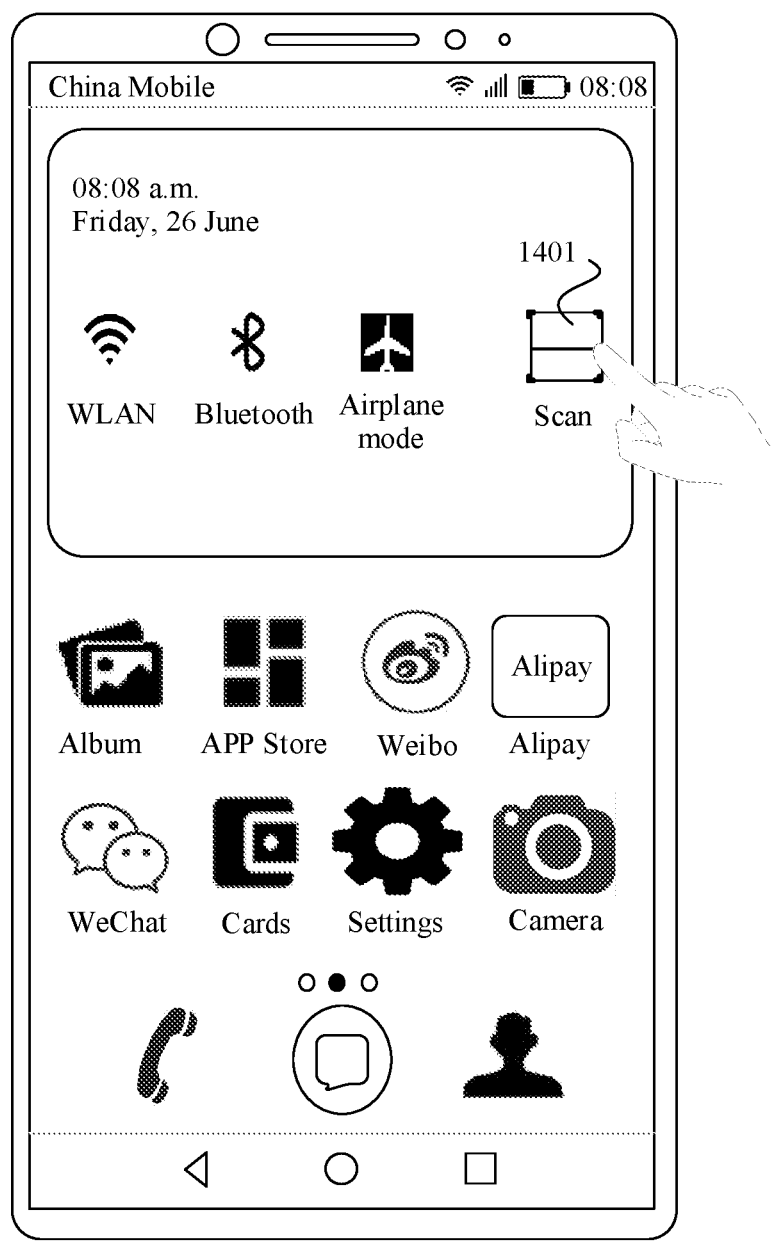
FIG. 14 is a schematic diagram of another interface according to an embodiment of this application.

For example, as shown in FIG. 14, the first operation that the user uses the first function of the first application may be an operation that the user taps a WeChat Scan shortcut icon 1401, and the first interface may be the interface shown in FIG. 5(d).

Figure 13:
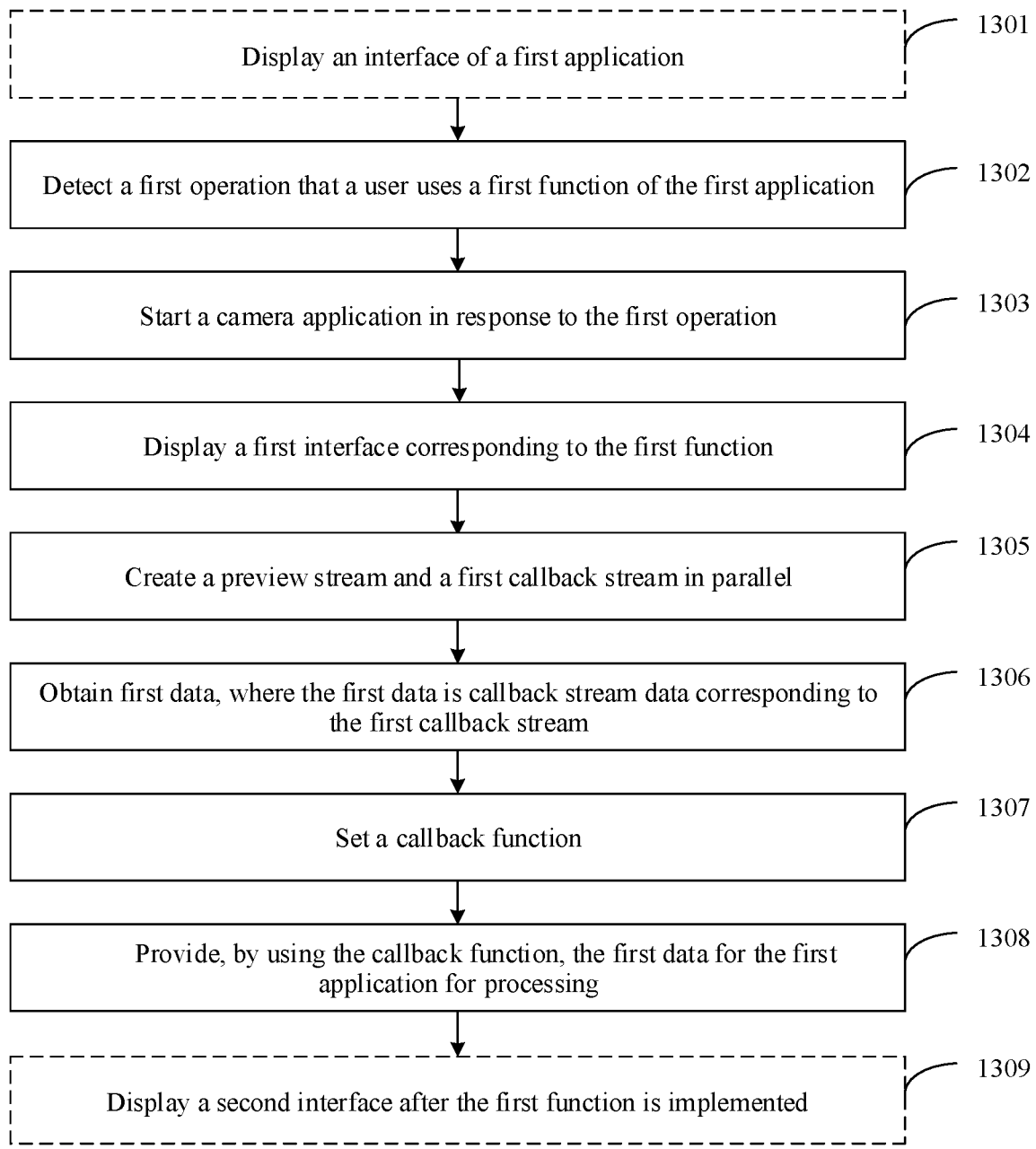
FIG. 13 is a flowchart of processing a callback stream according to an embodiment of this application.

In the solution described in the procedure shown in FIG. 13, after starting a camera by using the first application, if the electronic device determines that a current scenario is a callback stream scenario, the electronic device also creates the first callback stream in parallel when the first application indicates to create the preview stream, so that the electronic device can obtain the callback stream data in advance. Subsequently, after the first application sets the callback function based on service processing logic of the first application, the electronic device may not create a callback stream again, but directly returns the previously obtained callback stream data to the first application by using the callback function. In this way, compared with the conventional technology in which the electronic device serially creates a preview stream and a callback stream, a method in which the electronic device creates a preview stream and a callback stream in parallel can shorten a time consumed by the electronic device for creating a preview stream and a callback stream, shorten a time consumed by the first application for obtaining callback stream data, shorten a time consumed by the first application for processing the callback stream data to implement the first function, shorten a waiting time consumed by the user for using the first function, and improve user experience.

In addition, an embodiment of this application further provides an electronic device. The electronic device includes one or more processors, a memory, and one or more computer programs. The one or more computer programs are stored in the memory, and the one or more computer programs include instructions. When the instructions are executed by the one or more processors, the electronic device is enabled to perform the operations in the foregoing embodiment to implement the foregoing callback stream processing method.

An embodiment of this application further provides a computer storage medium. The computer storage medium stores computer instructions. When the computer instructions are run on an electronic device, the electronic device is enabled to perform the related method operations to implement the callback stream processing method in the foregoing embodiment.

An embodiment of this application further provides a computer program product. When the computer program product runs on a computer, the computer is enabled to perform the foregoing related operations to implement the callback stream processing method performed by the electronic device in the foregoing embodiment.

In addition, an embodiment of this application further provides an apparatus. The apparatus may be a chip, a component, or a module. The apparatus may include a processor and a memory that are connected. The memory is configured to store computer-executable instructions, and when the apparatus runs, the processor may execute the computer-executable instructions stored in the memory, so that the chip performs the callback stream processing method performed by the electronic device in the foregoing method embodiment.

The electronic device, the computer storage medium, the computer program product, or the chip provided in the embodiments may be configured to perform the corresponding methods provided above. Therefore, for beneficial effects that can be achieved, refer to the beneficial effects of the corresponding methods provided above. Details are not described herein again.

The foregoing descriptions about implementations allow a person skilled in the art to understand that, for convenient and brief description, division into the foregoing function modules is used as an example for illustration. During actual application, the foregoing functions may be allocated to different function modules as required, in other words, an inner structure of an apparatus is divided into different function modules to complete all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, in other words, may be located at one place, or may be distributed on different places. Some or all of the units may be selected according to actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the operations of the methods described in the embodiments of this application. The foregoing storage medium includes any medium that can store program code, such as a USB flash drive, a removable hard disk, a read only memory (read only memory, ROM), a random access memory (random access memory, RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A callback stream processing method applied to an electronic device comprising:
   detecting a first operation that a user uses a first function of a first application;
   starting a camera application in response to the first operation;
   producing image data, by the camera application using a camera on the electronic device, in response to starting the camera application;
   displaying a first interface corresponding to the first function;
   creating both a preview stream and a first callback stream in parallel from the image data that was produced by the camera application using the camera on the electronic device;
   obtaining first data, wherein the first data is callback stream data corresponding to the first callback stream;
   setting a callback function; and
   providing, by using the callback function, the first data for the first application for processing, to implement the first function.

2. The method according to claim 1, wherein, the electronic device comprises a parameter matching library, the parameter matching library comprises at least one scenario parameter group, and the scenario parameter group comprises a package name, an activity name, and a page name of an application; and before the creating a preview stream and a first callback stream in parallel, the method further comprises:
   obtaining a first scenario parameter group corresponding to the first interface; and
   determining that the first scenario parameter group matches a scenario parameter group in the parameter matching library.

3. The method according to claim 2, wherein, after the displaying a first interface corresponding to the first function, the method further comprises:
   obtaining a first package name of the first application corresponding to the first interface;
   searching the parameter matching library for a reference scenario parameter group comprising the first package name; and
   the determining that the first scenario parameter group matches a scenario parameter group in the parameter matching library comprises:
   determining that the first scenario parameter group matches the reference scenario parameter group.

4. The method according to claim 2, wherein, the at least one scenario parameter group in the parameter matching library is integrated into a package file of the first application; or
   the at least one scenario parameter group in the parameter matching library is pushed by a server; or
   the at least one scenario parameter group in the parameter matching library is obtained by the electronic device through learning.

5. The method according to claim 2, wherein, the method further comprises:
   when the first scenario parameter group does not match a scenario parameter group in the parameter matching library, creating the preview stream;
   when the callback function is set, creating a second callback stream;
   obtaining second data, wherein the second data is callback stream data corresponding to the second callback stream;
   providing, by using the callback function, the second data for the first application for processing; and storing the first scenario parameter group in the parameter matching library.

6. The method according to claim 1, wherein, before the obtaining first data, the method further comprises:
performing focusing by using the camera application.

7. The method according to claim 1, wherein, the first function is a code scanning function, a video chatting function, an augmented reality AR function, a smart object recognition function, a question scanning function, a bank card scanning function, or a certificate scanning function.

8. The method according to claim 2, wherein, an operating system of the electronic device comprises a camera service; and after the determining that the first scenario parameter group matches a scenario parameter group in the parameter matching library, the method further comprises:
setting, by the camera service, identification information; and
the creating a preview stream and a first callback stream in parallel comprises:
indicating, by the first application, to start previewing;
creating, by the camera service, the preview stream and the first callback stream in parallel based on the identification information; and
deleting, by the camera service, the identification information after creating the first callback stream.

9. The method according to claim 8, wherein, the obtaining first data comprises:
obtaining, by the camera service, the first data;
the setting a callback function comprises:
setting, by the first application, the callback function; and
the providing, by using the callback function, the first data for the first application for processing comprises:
providing, by the camera service by using the callback function, the first data for the first application for processing.

10. A two-dimensional code scanning method applied to an electronic device comprising:
detecting a first operation performed by a user on a code scanning function;
starting a camera application in response to the first operation;
producing image data, by the camera application using a camera on the electronic device, in response to starting the camera application;
displaying a first interface corresponding to the code scanning function, wherein a camera lens corresponding to the camera application is aligned with a two-dimensional code;
creating both a preview stream and a callback stream in parallel from the image data that was produced by the camera application using the camera on the electronic device;
obtaining first data based on the preview stream;
displaying a first image of the two-dimensional code based on the first data;
after the electronic device completes focusing, obtaining second data based on the callback stream, wherein the second data and the first data have different data formats; and
displaying a second interface based on the second data after code scanning succeeds.

11. The method according to claim 10, wherein, before the electronic device completes the focusing, the method further comprises:
obtaining third data based on the callback stream; and
discarding the third data.

12. The method according to claim 10, wherein, after the electronic device completes the focusing, the method further comprises:
obtaining fourth data based on the preview stream; and
displaying a second image of the two-dimensional code based on the fourth data, wherein the first image and the second image have different pixel values of pixels.

13. An electronic device comprising:
a screen configured to display an interface;
one or more processors; and
a memory, wherein the memory stores code, wherein, when the code is executed by the electronic device, the electronic device is enabled to perform operations comprising:
detecting a first operation that a user uses a first function of a first application;
starting a camera application in response to the first operation;
producing image data, by the camera application using a camera on the electronic device, in response to starting the camera application;
displaying a first interface corresponding to the first function;
creating both a preview stream and a first callback stream in parallel from the image data that was produced by the camera application using the camera on the electronic device;
obtaining first data, wherein the first data is callback stream data corresponding to the first callback stream;
setting a callback function; and
providing, by using the callback function, the first data for the first application for processing, to implement the first function.

14. The electronic device according to claim 13, wherein, the electronic device comprises a parameter matching library, the parameter matching library comprises at least one scenario parameter group, and the scenario parameter group comprises a package name, an activity name, and a page name of an application; and when the code is executed by the electronic device, the electronic device is further enabled to perform operations comprising:
before the creating a preview stream and a first callback stream in parallel, obtaining a first scenario parameter group corresponding to the first interface; and
determining that the first scenario parameter group matches a scenario parameter group in the parameter matching library.

15. The electronic device according to claim 14, wherein, when the code is executed by the electronic device, the electronic device is further enabled to perform operations comprising:
after the displaying a first interface corresponding to the first function, obtaining a first package name of the first application corresponding to the first interface; and
searching the parameter matching library for a reference scenario parameter group comprising the first package name; and
wherein, the determining that the first scenario parameter group matches a scenario parameter group in the parameter matching library comprises:
determining that the first scenario parameter group matches the reference scenario parameter group.

16. The electronic device according to claim 14, wherein, the at least one scenario parameter group in the parameter matching library is integrated into a package file of the first application; or the at least one scenario parameter group in the parameter matching library is pushed by a server; or the at least one scenario parameter group in the parameter matching library is obtained by the electronic device through learning.

17. The electronic device according to claim 14, wherein, when the code is executed by the electronic device, the electronic device is further enabled to perform operations comprising:

when the first scenario parameter group does not match a scenario parameter group in the parameter matching library, creating the preview stream;

when the callback function is set, creating a second callback stream;

obtaining second data, wherein the second data is callback stream data corresponding to the second callback stream;

providing, by using the callback function, the second data for the first application for processing; and storing the first scenario parameter group in the parameter matching library.

18. The electronic device according to claim 13, wherein, when the code is executed by the electronic device, the electronic device is further enabled to perform operations comprising:

before the obtaining first data, performing focusing by using the camera application.

19. The electronic device according to claim 14, wherein, an operating system of the electronic device comprises a camera service; and when the code is executed by the electronic device, the electronic device is further enabled to perform operations comprising:

after the determining that the first scenario parameter group matches a scenario parameter group in the parameter matching library, setting, by the camera service, identification information; and the creating a preview stream and a first callback stream in parallel comprises:

indicating, by the first application, to start previewing;

creating, by the camera service, the preview stream and the first callback stream in parallel based on the identification information; and deleting, by the camera service, the identification information after creating the first callback stream.

20. The electronic device according to claim 19, wherein the obtaining first data comprises:

obtaining, by the camera service, the first data;

the setting a callback function comprises:

setting, by the first application, the callback function; and the providing, by using the callback function, the first data for the first application for processing comprises:

providing, by the camera service by using the callback function, the first data for the first application for processing.

* * * * *